US006959756B2

(12) United States Patent
Woodard et al.

(10) Patent No.: US 6,959,756 B2
(45) Date of Patent: Nov. 1, 2005

(54) DEVICE FOR COOLING A BEARING; FLYWHEEL ENERGY STORAGE SYSTEM USING SUCH A BEARING COOLING DEVICE AND METHODS RELATED THERETO

(75) Inventors: Nathan G. Woodard, Pasadena, CA (US); Omar M. Kabir, Delanson, NY (US); Jeremiah I. Rathbun, Peabody, MA (US)

(73) Assignee: Beacon Power Corporation, Wilmington, MA (US)

( * ) Notice: Subject to any disclaimer, the term of this patent is extended or adjusted under 35 U.S.C. 154(b) by 0 days.

(21) Appl. No.: 09/924,153

(22) Filed: Aug. 7, 2001

(65) Prior Publication Data

US 2003/0029600 A1 Feb. 13, 2003

(51) Int. Cl.⁷ .............................................. F16C 37/00
(52) U.S. Cl. .......................... 165/86; 165/185; 384/476
(58) Field of Search ...................... 165/185, 86; 384/476

(56) References Cited

U.S. PATENT DOCUMENTS

| | | | | | |
|---|---|---|---|---|---|
| 3,746,087 A | * | 7/1973 | Lavering et al. | ............. | 165/185 |
| 4,437,030 A | * | 3/1984 | Coquillart | ................... | 310/227 |
| 5,214,981 A | * | 6/1993 | Weinberger et al. | ...... | 74/573 R |
| 5,317,879 A | * | 6/1994 | Goldberg et al. | ............. | 62/51.1 |
| 5,390,734 A | * | 2/1995 | Voorhes et al. | ............. | 165/185 |
| 5,650,914 A | * | 7/1997 | DiStefano et al. | .......... | 361/704 |
| 6,060,166 A | * | 5/2000 | Hoover et al. | .............. | 428/408 |
| 6,286,591 B1 | * | 9/2001 | Bonneville | .................. | 165/185 |
| 6,367,509 B1 | * | 4/2002 | Bonneville et al. | ....... | 138/96 R |

FOREIGN PATENT DOCUMENTS

DE            2624959 A1  * 12/1977   ........... F16C/37/00

* cited by examiner

Primary Examiner—Allen J. Flanigan
(74) Attorney, Agent, or Firm—David G. Conlin; William J. Daley, Jr.; Edwards & Angell, LLP

(57) ABSTRACT

Featured is a heat transferring device being configured and arranged so that at least some of the heat energy being generated by a heat producing device, such as the a bearing assembly of a flywheel energy storage system, is communicated directly from the locus of the device directly to a heat sink structure remote from the locus of the device. The heat-transferring device includes one or more flexible thermally conductive members, one end of each being thermally coupled to the heat generating device and the other end of each being thermally coupled to the heat sink. The flexible member also is configured and arranged so as to allow relative motion between the heat generating device and the heat sink in or about one or more directions or axes. The heat-transferring device further includes first and second conductive members that are each configured and arranged to thermally couple each flexible member end to one of the heat producing device and the heat sink.

66 Claims, 9 Drawing Sheets

DEVICE FOR COOLING A BEARING; FLYWHEEL ENERGY STORAGE SYSTEM USING SUCH A BEARING COOLING DEVICE AND METHODS RELATED THERETO

FIELD OF INVENTION

The present invention relates generally to flywheel energy storage systems, and more particularly to devices and methods for cooling bearings and other heat producing mechanisms utilized in flywheel energy storage systems, which systems use a vacuum environment to reduce windage losses.

BACKGROUND OF THE INVENTION

The ability of flywheels to accept and release energy over relatively short time periods has been known for many years and energy storage flywheels have been used, or proposed for use, in a variety of applications. Such proposed and actual use applications include motor vehicle applications and stand alone supplemental energy sources.

There is shown in FIG. 1 a simplified view of a conventional flywheel energy storage system 100 used for storing kinetic energy. The conventional flywheel system 100 includes a flywheel assembly 104 disposed in a flywheel housing 102. Further, the flywheel housing is configured and arranged so such flywheel assemblies 104 are run under vacuum, in order to avoid drag on the flywheel. The systems are evacuated with standard vacuum pumps, e.g. turbo pumps, and then sealed, preferably by pinching off and then fusing the end of a copper tube, thus forming an all-metal seal, which is impervious to air. The materials that make up the flywheel system, however, may entrain or evolve substantial quantities of materials that may be released within the system when under a vacuum, thus causing a reduction of the vacuum during operation. To partially deal with that problem, a drag pump 106 for example, is incorporated into the flywheel assembly 104 for pumping gases from the flywheel housing 102 into a separate gas storage chamber 108.

The typical flywheel assembly 104 includes a flywheel, a shaft to which is secured the flywheel and one or more bearings or bearing assemblies that rotatably support the shaft. Traditionally, flywheels have been made of metal, e.g., high strength steel. More recently, flywheels have been fabricated using fiber composite materials, e.g., fiberglass or carbon wound with a resin binder, thereby making flywheels that are lighter in weight and capable of operating at higher speeds than the traditional metal flywheel assemblies operate.

Because the rotatable supporting of the rotating flywheel results in the production of heat energy in the bearings or bearing assemblies, the operational life of the flywheel assembly 104 as well as the operational life of the flywheel energy storage system 100 is dependent in part upon the ability of the flywheel energy storage system to dissipate heat energy developed in the bearings or bearing assemblies. One conventional technique to dissipate this heat energy involves cooling the fluid that lubricates the bearings or providing a separate fluid cooling system for the bearings. This technique, however, necessarily requires that the lubricated bearings and/or cooling systems be sealed and not exposed to the vacuum environment within the flywheel housing 102 as well as providing a mechanism for putting the cooling medium in thermal connection with the environment outside of the flywheel housing.

Another technique involves the use of the supporting structure(s) for the flywheel and the bearings or bearing assemblies as a thermal conduction path to conduct the heat energy of the bearings to the flywheel housing 102. The heat energy is thence communicated to the external environment via the flywheel housing. Such a heat dissipation technique, however, is not compatible with flexible bearing mounting arrangements.

It thus would be desirable to provide a new and improved device or mechanism that dissipates heat energy from a bearing assembly in particular the outer race of a bearing assembly to the external environment. It also would be desirable to provide such a new heat conducting device or mechanism that conducts heat energy from a bearing to a heat sink while allowing relative axial and radial motion. It would be more particularly desirable to provide such a heat conducting device or mechanism that, when used in a flywheel energy storage system, would provide a thermal conduction path that more efficiently conducts the heat energy from the bearing assembly to the external environment, particularly when compared to devices embodying non-fluidic prior art techniques. Such a heat conducting device or mechanism preferably would be simple in construction and less costly than prior art devices and such methods for conducting heat energy from bearings would not require highly skilled users to utilize the device.

SUMMARY OF THE INVENTION

The present invention features a heat transferring device that dissipate heat energy being generated by a device that produces or generates unusable heat energy during operation such as a bearing(s), more particularly the one or more bearing assemblies of a flywheel energy storage system being under a vacuum environment. Such a heat transferring device is advantageously configured and arranged so that at least some of the heat energy of the heat generating device or bearing is communicated directly from the locus of the bearing or heat generating device directly to a heat sink structure remote from the locus of the bearing or heat generating device.

In its broad aspect, a heat transferring device according to the present invention includes a flexible thermally conductive member, one end of which is thermally coupled to a heat generating device and the other end of which is thermally coupled to a heat sink. The flexible member also is configured and arranged so that at least some of the heat energy being produced by the heat-generating device is communicated to the heat sink. Further, the flexible member is configured and arranged so as to allow relative motion between the heat generating device and the heat sink in at least one direction, more specifically relative motion in at least two directions or dimensions (i.e., two axes), more particularly relative motion in three dimensions (i.e., three axes). As also indicated above, in specific applications, the heat generating device is a bearing(s) or bearing assembly(s) such as those utilized in connection with flywheel energy storage systems.

In more specific embodiments, the heat-transferring device includes a plurality, more particularly a multiplicity, of flexible members, where one end of each flexible member is thermally coupled to the heat generating device and the other end of each flexible member is thermally coupled to the heat sink. Further, the flexible member can comprise a multi-strand cable, one or more strands being made from a thermally conductive material. Additionally, the heat transferring device can further include first and second conductive members, the first conductive member being configured and arranged to thermally couple said one end of the flexible member to the heat producing device and the second member being configured to thermally couple said other end of the flexible member to the heat sink.

In one further embodiment, the plurality/multiplicity of flexible members and the first and second conductive members are configured and arranged such that the flexible members extend in a generally radial direction between the first and second conductive members. In another further embodiment, the flexible members and the first and second conductive members are configured and arranged so the flexible members extend in a generally axial direction between the first and second conductive members. In exemplary embodiments, the flexible members are configured and arranged so a portion of each between the first and second conductive members is arcuate.

A heat-transferring device according to one embodiment of the present invention includes first and second conductive members and a third flexible conductive member. The first conductive member is thermally connected or coupled to the heat generating device (e.g., bearing) and the second conductive member is thermally connected or coupled to a heat sink. As indicated above the heat sink is remote from the locus of the bearing or heat generating device to be cooled.

The third flexible conductive member is thermally connected or coupled to the first and second conductive members such that at least some of the heat energy being generated by the bearing or other device is thermally communicated to the heat sink via the first, third and second conductive members respectively. Further, the third flexible conductive member is configured and arranged so as to allow at least one of relative axial, radial or angular/transverse/rotational motion, preferably both axial and radial motion, more preferably axial, radial and angular motion, between the first and second conductive members. More particularly, the third flexible conductive member is configured and arranged so as to have spring constants in each of the axial, radial and angular/transverse/rotational directions that are equal to or less than a desired value for each of the axial, radial and angular directions. In exemplary embodiments, such spring constants are generally in the range of from about 10 to about 10,000 lb/in, and more particularly in the range of about 50 to about 200 lb/in.

In further embodiments, the first and second conductive members are configured and arranged so that they are generally spaced from each other in at least one of a radial or an axial direction. In the case where they are generally radial spaced from each other, one of the first and second conductive members is disposed in a volume that is generally bounded about its circumference by the other conductive member. In a more specific embodiment, the first and second conductive members are arranged so radials extending between the first and second conductive members generally lie in the same plane.

In specific embodiments of the present invention, the third flexible conductive member is composed at least in part of a thermally conductive material and further can be comprised of a plurality, more specifically a multiplicity, of flexible thermally conductive elements, each conductive element extending between, and being thermally connected or coupled to each of, the first and second conductive members. Each conductive element can comprise a flexible multi-strand cable, where a plurality or more of the strands are made of a thermally conductive material, sufficient in number so as to be capable of conducting a desired level of heat energy. In a more specific embodiment, each strand is comprised of a thermally conductive material. More specifically, the thermally conductive material is at least one of copper, aluminum, silver and carbon. Also, each of the first and second conductive members comprises a thermally conductive material that is at least one of copper, aluminum, silver and carbon. Further, the carbon also can be in the form of carbon fibers or an epoxy-carbon fiber matrix.

Also featured is a flywheel energy storage system including one or more of such heat transferring devices to cool one or more bearing assemblies and/or heat generating devices (e.g., motor) of the flywheel storage system. In an exemplary embodiment, the flywheel energy storage system includes a flywheel, a shaft to which is secured the flywheel, at least one bearing assembly that rotatably supports the shaft, a heat sink, and a heat transferring device for the at least one bearing assembly and/or heat generating device as herein described.

The heat-transferring device includes a first conductive member that is thermally connected to said at least one bearing assembly and a second conductive member that is thermally connected to the heat sink. Also included is a third flexible, conductive member that is thermally connected to the first and second conductive members such that at least some of the heat energy being generated by said at least one bearing assembly is thermally communicated, for example by conduction, to the heat sink via the first, third and second conductive members respectively.

Also, the third flexible conductive member is configured and arranged so as to allow relative axial and radial motion, more particularly relative axial, radial and angular motion, between the first and second conductive members. More specifically, the third flexible, conductive member is configured and arranged so as to have spring constants in each of the axial, radial and angular directions that are equal to or less than a desired value for each of the axial, radial and angular directions.

In a specific embodiment, a flywheel energy storage system according to the present invention further includes a plurality of heat transferring devices for each of the at least one bearing assembly, where each of the heat transferring devices are displaced axially from each other. Alternatively, the flywheel energy storage system can comprise a plurality of bearing assemblies and a plurality of heat transferring devices, at least one heat transferring device for each of said plurality of bearing assemblies. Further, the flywheel energy storage system can include a plurality of heat transferring devices for each of said plurality of bearing assemblies.

In specific embodiments of the present invention, the third flexible conductive member is composed at least in part of a thermally conductive material and further can be comprised of a plurality, more specifically a multiplicity, of flexible thermally conductive elements, each conductive element extending between, and being thermally connected to each of, the first and second conductive members. Each conductive element can comprise a flexible multi-strand cable, where a plurality or more of the strands are made of a thermally conductive material, sufficient in number so as to be capable of conducting a desired level of heat energy. In a more specific embodiment, each strand is comprised of a thermally conductive material. More specifically, the thermally conductive material is at least one of copper, aluminum, silver and carbon. Also, each of the first and second conductive members comprises a thermally conductive material that is at least one of copper, aluminum, silver and carbon. Further, the carbon also can be in the form of carbon fibers or an epoxy-carbon fiber matrix.

Further featured are various methods according to the present invention for dissipating un-useable heat energy being generated by heat producing/generating device, for example a bearing such as the bearing assembly for a flywheel energy storage system. In its broadest aspect, such a method according to the present invention includes thermally coupling or connecting the heat-generating device (e.g., bearing) or other device to a heat sink using a flexible thermally conductive member. More particularly, one end of the flexible thermally conductive member is thermally coupled to the heat-generating device and another end of the flexible thermally conductive member is thermally coupled to the heat sink. Such thermally coupling of the heat generating device and the heat sink also includes configuring and arranging the flexible thermally conductive member so that at least some of the heat energy being produced by the heat-generating device is communicated to the heat sink. Such configuring and arranging also includes configuring and arranging the flexible thermally conductive member so as to allow relative motion between the heat-generating device and the heat sink in at least one direction, more specifically relative motion in at least two directions or dimensions (i.e., two axes), more particularly relative motion in three dimensions (i.e., three axes).

According to another aspect of the present invention, such a method of the present invention includes the following: first thermally interconnecting a first conductive member to the heat generating device; second thermally interconnecting a second conductive member to the heat sink; and third thermally interconnecting the first and second conductive members such that at least some of the heat energy being generated by the heat generating device is thermally communicated or coupled to the heat sink. This third thermally interconnecting further includes thermally interconnecting or coupling a third flexible conductive member to the first and second conductive members such that at least some of the heat energy being generated by heat generating device is thermally communicated or conducted to the heat sink via the first, third and second conductive members respectively. Such a method also includes configuring the third flexible conductive member so as to allow relative axial and radial motion, more particularly relative axial, radial and angular motion, between the first and second conductive members. This configuring also can include configuring the third flexible conductive member such that it has spring constants in each of, at least one of, the axial, radial and angular directions that are equal to or less than a desired value for each of the axial, radial and angular directions.

In specific embodiments, the heat dissipating method further includes providing a plurality of first, second and third conductive members and wherein the step of thermally connecting further includes thermally interconnecting each of the plurality of the first and second conductive members respectively to the heat generating device and the heat sink, and thermally interconnecting each of the plurality of third conductive members to each pair of corresponding first and second conductive members.

The third thermally conductive member can comprise a multiplicity of flexible thermally conductive elements. In such a case the step of thermally interconnecting further includes extending each conductive element between, and thermally connecting/coupling each conductive element to, the first and second conductive members. In this way, at least some of the heat energy being generated by the heat-generating device (e.g., bearing) is thermally communicated or conducted to the heat sink via the first conductive member, the multiplicity of conductive elements and the second conductive member respectively.

In further specific embodiments, the third flexible conductive member is composed at least in part of a thermally conductive material and further can be comprised of a plurality, more specifically a multiplicity, of flexible thermally conductive elements, each conductive element extending between, and being thermally connected to each of, the first and second conductive members. Each conductive element can comprise a flexible multi-strand cable or a strand thereof, where a plurality or more of the strands are made of a thermally conductive material, sufficient in number so as to be capable of conducting a desired level of heat energy. In a more specific embodiment, each strand is comprised of a thermally conductive material. More specifically, the thermally conductive material is at least one of copper, aluminum, silver and carbon. Also, each of the first and second conductive members comprises a thermally conductive material that is at least one of copper, aluminum, silver and carbon. Further, the carbon also can be in the form of carbon fibers or an epoxy-carbon fiber matrix.

According to further aspect of the present invention, such a method includes the step of thermally connecting at least one heat transferring device to the heat generating device (e.g., bearing, bearing assembly) and to a heat sink, such that at least some of the heat energy being generated by the device is thermally communicated or conducted to the heat sink via the at least one heat transferring device according to the present invention. In a specific embodiment, the step of thermally connecting includes thermally connecting a plurality of heat transferring devices to the heat generating device and to the heat sink, such that the at least some of the heat energy being generated by the device (e.g., bearing) is thermally communicated or conducted to the heat sink via the plurality of heat transferring devices.

In the case where there is a plurality of heat generating devices generating un-usable heat energy, the step of thermally connecting includes thermally connecting at least one heat transferring device to each of the plurality devices and the heat sink, such that the at least some of the heat energy being generated by each of the plurality of devices is thermally conducted to the heat sink via at least one heat transferring device. In an alternative embodiment, the step of thermally connecting includes thermally connecting a plurality of heat transferring devices to each of the plurality of devices and to the heat sink, such that the at least some of the heat energy being generated by each of the plurality of devices is thermally communicated/conducted to the heat sink via the plurality of heat transferring devices.

Other aspects and embodiments of the invention are discussed below.

BRIEF DESCRIPTION OF THE DRAWING

For a fuller understanding of the nature and desired objects of the present invention, reference is made to the following detailed description taken in conjunction with the accompanying drawing figures wherein like reference characters denote corresponding parts throughout the several views and wherein.

DESCRIPTION OF THE PREFERRED EMBODIMENT

Figure 1:
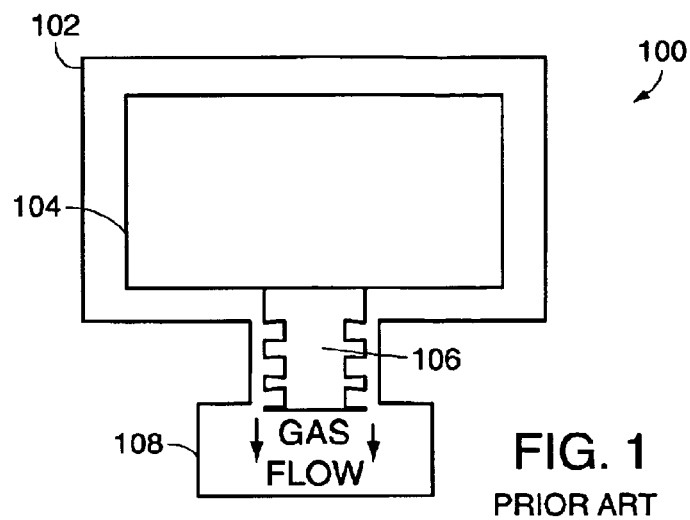
FIG. 1 is a simplified schematic view of a conventional flywheel energy storage system.
Figure 2A:
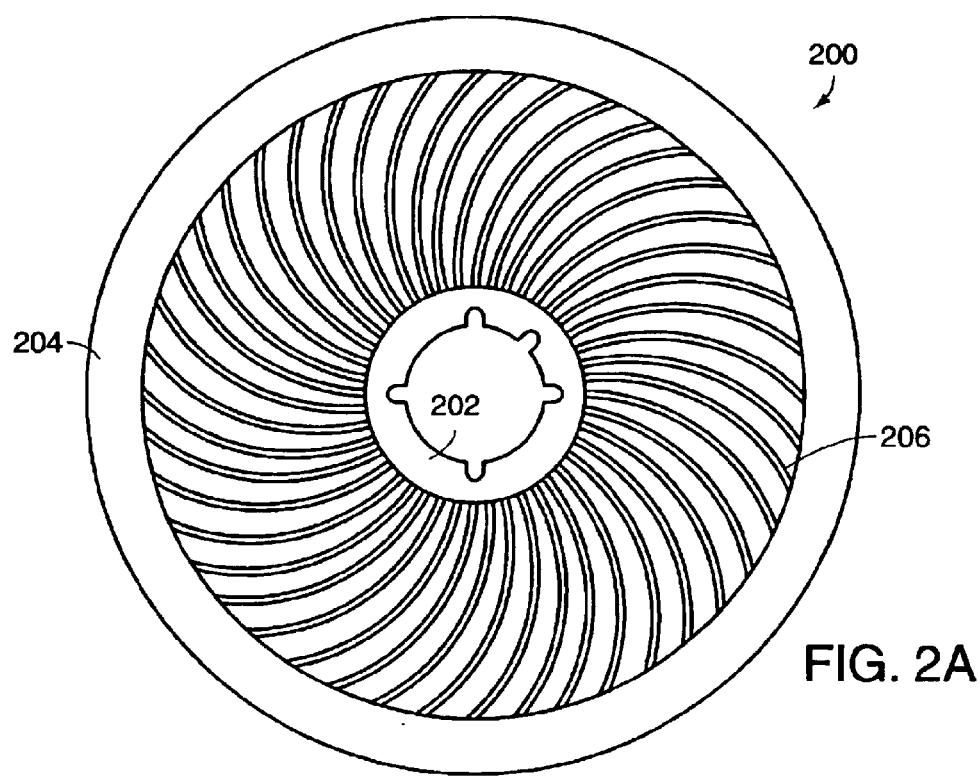
FIGS. 2A, B are a plan and side view, respectively, of a heat transferring assembly according to a first aspect of the present invention.

Referring now to the various figures of the drawing wherein like reference characters refer to like parts, there is shown in FIGS. 2A, B a plan and side view respectively of a heat transferring assembly 200 according to one aspect of the present invention. The heat transferring assembly 200 includes an inner member 202, an outer member 204 and one or more, a plurality, or more particularly a multiplicity, of intermediate members 206. The inner, outer and intermediate members 202–206 are each generally composed, at least in part, of a material that can receive and transfer heat energy, for example by conduction, and which are arranged and configured such that heat energy generated by a component, functionality, member or the like of an apparatus/system and being received by the inner member 202 is communicated to the outer member 204 by each of the one or more/plurality/multiplicity of intermediate members 206 and so that the heat energy being received by the outer member 204 from intermediate members is communicated to a heat sink and/or structure remote from the component, functionality, member or the like to be cooled. In the case of flywheel energy storage system such a remote structure comprises, for example, the grounding heat transfer part thereof.

The inner member 202 is configured so as to be placed in thermal engagement with the member, component or the like of an apparatus or system, such as the bearing assembly of a flywheel energy storage system, from which heat energy is to be withdrawn and communicated to a remote structure/heat sink by means of the heat transferring assembly 200. More particularly, the inner member 202 is configured and sized so as to provide a surface area sufficient for transferring heat energy from a structure disposed between the source and the inner member or the source, to the inner member. In this regard, at least a portion of the heat energy being produced by the member, component or the like comprising the source of heat energy is communicated to the inner member 202 for transfer to the remote structure/heat sink. In more particular embodiments, a majority of the heat energy being produced is communicated to the inner member for transfer onto the remote structure/heat sink, more specifically, at least 50% or more of the heat energy and even more specifically about 80% or more of the heat energy is communicated for transfer to the remote structure/heat sink. The inner member 202 also is generally configured and sized so it can be integrated with the other components of the apparatus or system such as a flywheel energy storage system.

In an exemplary embodiment, as illustrated in FIG. 2A, the inner member 202 is configured as a ring shaped member which shape generally conforms to the corresponding cross-sectional shape of the bearing or other heat producing device from which heat energy is being communicated to the inner member. It is within the scope of the present invention, however, for other geometrical shapes such as polygons (e.g., octagons and the like) to be utilized and/or adapted for use as an inner member 202 consistent with the characteristics and attributes desired for a heat transferring assembly 200 of the present invention such as the heat transfer properties thereof or providing for relative motion between the inner and outer members.

Similarly, the outer member 204 is configured so as to be placed in thermal engagement with the remote structure or heat sink to which is dissipated the heat energy from the member, component or the like and communicated to the remote structure/heat sink by means of the heat transferring assembly 200. More particularly, the outer member 204 is configured and sized so as to provide a surface area sufficient for transferring heat energy from the outer member to the remote structure or heat sink. In an exemplary embodiment and as illustrated in FIG. 2A, the outer member 204 is configured as a ring shaped member so as to complement the shape of the inner member 202 and so as to be generally concentric about the circumference of the inner member and with respect to the geometric center of the inner member. It is within the scope of the present invention, however, for other geometrical shapes such as polygons (e.g., octagons and the like) to be utilized and/or adapted for use as an outer member 204 consistent with the characteristics and attributes for a heat-transferring device 200 of the present invention. It also is within the scope of the present invention for the geometric shapes for each of the inner and outer members 202, 204 to be different from each other, which shapes are selected so as to yield a heat transferring assembly 200 having particular heat transfer and relative motion characteristics.

Figure 2B:
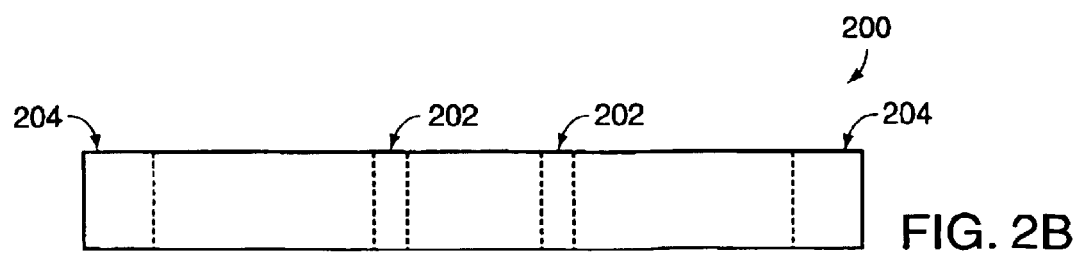
FIGS. 2C, D are cross-sectional views of alternate embodiments of the heat transferring assembly according to the first aspect with the intermediary members omitted for clarity.
Figure 2C:
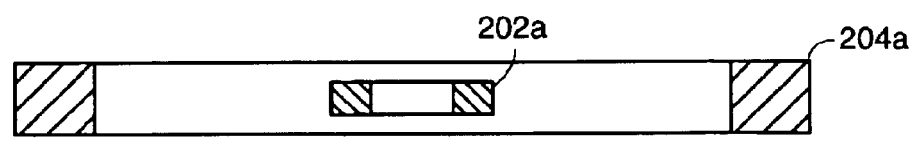
Figure 2D:
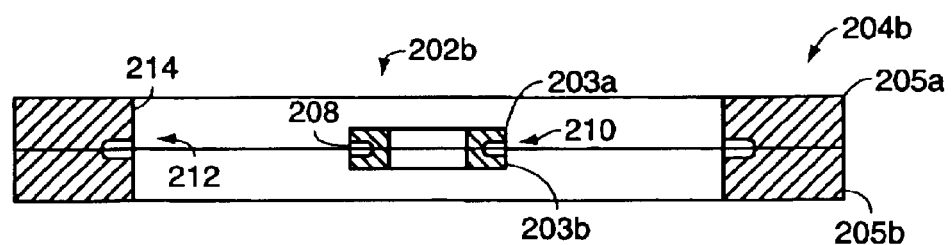

As illustrated in FIGS. 2B, 2C the inner member 202, 202a and/or the outer member 204, 204a are configurable as a generally solid or unitary member. Alternatively and as shown in FIG. 2D, the inner member 202b and/or the outer member 204b are formed from a plurality of layers 203a,b; 205a,b, where the layers are mechanically secured to each other using any of a number of mechanisms, methods or techniques known to those skilled in the art. For example, the inner and outer member layers 203a,b; 205a,b can be secured to each other by welding, brazing, soldering, adhesives or mechanical fasteners such as screws, nuts and bolts.

It also is within the scope of the present invention for one of the members to be solid and the other member formed from a plurality of layers.

In another embodiment, the solid or unitary member structure or each of said plurality of layers is a laminated structure comprised of n laminations, where n is equal to or greater than 2. Similarly, the solid or unitary member structure of the inner and outer members of FIGS. 2A–C also can be arranged to comprise such a laminated structure. In yet another embodiment, the inner and/or outer members are configurable so as to include hollow regions or chambers therein.

The foregoing is illustrative of some techniques and methods that can be adapted so as to yield some possible different configurations for the inner and outer members according to the present invention. Thus, the present invention shall not be considered as being limited to a particularly described configuration, rather it is within the scope of the present invention to adapt any of a number of known techniques or methods known in that art to yield a particular structure for an inner or an outer member that would be otherwise consistent with the disclosures of the present invention.

As also illustrated in FIGS. 2B–D, the inner member 202, 202a, 202b also are configurable so that the thickness of the inner member is the same as the thickness of the outer member 204, 204a, 204b or the thickness thereof is different from that of the outer member. The thickness of the inner and outer members is established so as to provide a sufficient area for attaching each intermediate member 206 to the inner and outer members and so that, dependent upon the form of attachment, there is sufficient area for transferring heat energy from the inner member to each intermediate member and, correspondingly, from each intermediate member to the outer member. The thickness of the inner and outer members also is established based on constraints imposed by the physical structure of the apparatus or system, such as a flywheel energy storage system, which embodies one or more heat transferring assemblies 200 of the present invention.

The inner and outer members 202, 204 are each composed at least in part of a material that can readily receive and transfer heat energy, for example by conduction. In exemplary embodiments, the inner and outer members 202, 204 are completely comprised of such a material and such material includes a thermally conductive material such as copper, aluminum, silver and carbon. The carbon also can be in the form of carbon fibers or an epoxy fiber matrix.

Alternatively, the inner and outer members 202, 204 comprise a composite, mixture, alloy or the like of any of a number of materials to form a structural member that optimizes heat transfer characteristics and other material and structural characteristics, such as compressibility and resistance to degradation such as that caused by environmental and operational conditions. In general, the materials comprising the inner and outer members 202, 204 should yield a member having the desired characteristics so as to be capable of transferring the at least a portion of the heat energy being produced. The materials also shall yield a member capable of withstanding the expected normal operational loadings and normal environmental conditions without undergoing structural failure or causing miss-operation of the system or apparatus. Such materials include, but are not limited to, aluminum oxide compounds and beryllium copper alloys.

In an alternative embodiment, the inner and outer members 202, 204 each comprise a generally rigid structure being generally hollow and having open areas provided in the surfaces that are generally defined by the structure and which are intended to receive or communicate the heat energy. The material comprising the rigid structure is any of a number of materials known in the art that have good structural properties. A heat conductive material is disposed or located within the rigid structure so the heat conductive material and the rigid material form a generally unitary structure. The material comprising the rigid structure, however, need not have the same or equivalent heat transfer properties as the heat conductive material and it is within the scope of the present invention for the rigid structure to have poorer transfer properties as compared to the heat conductive material. In this way, heat energy is communicated generally by means of the heat conductive material and the generally rigid structure or the rigid structure and the conductive material provide the desired structural characteristics for the inner or outer member. The heat conductive materials include, but are not limited to, aluminum and copper and the materials for the rigid structure include, but are not limited to steel, titanium and nickel.

Similarly, in the case where the inner member 202 or outer member 204 is a laminated structure, the material comprising each lamination can be selected such that all of the laminations are of the same heat conductive material, so that all of the laminations are comprised of a plurality of heat conductive materials, and/or so that the laminations comprise materials having a wide range of heat transfer properties that are selected to optimize the heat transfer and structural properties of the inner and/or outer member. In exemplary embodiments, the laminations are made up of aluminum or copper.

Each intermediate member 206 extends between the inner member 202 and the outer member 204 and the ends of each intermediate member are connected to the inner and outer members respectively using any of a number of techniques known to those skilled in the art. The ends of each intermediate member 206 also are each thermally connected to one of the inner and outer members 202, 204 so that heat energy in the inner member 202 flows into each intermediate member and so that this heat energy flows through each intermediate member, into the outer member 204 and thereby onto the remote heat sink/structure.

Each intermediate member 206 is further configured and each intermediate member is arranged with respect to each of the inner and outer members 202, 204 such that the inner and outer members are movable with respect to each other in at least one of a radial direction, an axial direction, or an angular direction. More particularly, the configuration of these three members 202–206 and the arrangement of each intermediate member 206 are set so as to allow the inner and outer members 202, 204 to move with respect to each other in both the axial and radial directions, more specifically in the axial, radial and angular directions. That is, each intermediate member 206 provides little structural stiffness (e.g., force per deflection) between the inner and outer members 202, 204.

In more specific embodiments, the one or more, plurality or multiplicity of intermediate members 206 are configured and arranged so that the heat transferring assembly 200 has low spring constants in both the axial and radial directions, more particularly in the axial, radial and angular directions. In exemplary embodiments, such spring constants are generally in the range of from about 10 to about 1,000 lb/in, and more particularly in the range of from about 50 to about 200 lb/in. In the case of a flywheel energy storage system, such low spring constants provide a mechanism to prevent interactions between the heat transferring assembly 200 and other system components, such as for example, an active lift bearing. In an illustrative embodiment (e.g., see FIG. 2A), each intermediate member 206 is arranged so as extend along an arc or a curved path between the inner and outer members 202, 204.

The one or more, plurality or multiplicity of intermediate members 206 can comprise any of a number of structural members known in the art having the above characteristics of heat transfer and flexibility, including a solid member such as a cylindrical member (e.g., a solid wire), a hollow tubular member or a member comprised of a multiplicity of strands or individual elements (e.g. a multi-stranded cable). Such members also are made from any of a number of materials known in the art including copper, silver, aluminum or carbon such as carbon fibers. As also noted in the discussion above regarding the inner and outer members 202, 204, the intermediate members are not thus limited to these specific materials but can include other materials, alloys, combinations of materials as well as adapting for use any of a number of well known techniques or methods (e.g., laminating) to yield such a member as is more fully discussed above. Each intermediate member 206 also can be configured such that one or more portions thereof is a different structural element, for example, the ends can be a solid material and the portion there between can be composed of a flexible structural element, like a multi-stranded cable.

In an alternative embodiment, each intermediate member 206 comprises a heat tube as is known in the art which communicates heat energy from one end of the tube to another by means of capillary forces or gravity assist. In an illustrative embodiment, the ends of the heat tube are of a material and construction such that the ends can be mechanically and thermally connected to each of the inner and outer members. For example, the ends can comprise a solid member such as a solid cylindrical copper member.

As noted above, the one or more, plurality or multiplicity of intermediate members 206 are mechanically and thermally connected to the inner and outer members 202, 204 using any of a number of techniques known to those skilled in the art. The specific technique or method for mechanically and thermally interconnecting each intermediate member 206 to the inner and outer members 202, 204 is dependent upon the materials comprising these three members, the structure or shape of these three members and the ability for that type of connection for allowing the heat energy to flow between the interconnected members. As illustration such techniques and methods include soldering, brazing, welding, clamping and adhesively securing.

In an exemplary embodiment (e.g., see FIG. 2D) the inner member 202b and the outer member 204b are each configured so as to include therein one or more, a plurality, or more particularly a multiplicity, of recesses or pockets 210, 212, one pocket in each of the inner and outer members for each intermediate member 206. The inner member pockets 210 are disposed about the circumference of an outer radial surface 208 of the inner member 202 and the outer member pockets 212 are disposed about the circumference of an inner radial surface 214 of the outer member 204. The ends of each intermediate member 206 are received in the pockets 210,212 of the inner members 202b, 204b and are secured therein using any of a number of techniques or methods as described herein. In more specific embodiments, each intermediate member 206 extends between the inner and outer members 202b, 204b, along an arcuate path such as that illustrated in FIG. 2A. As such, the ends of each intermediate member 206 are angularly displaced from each other. In other words, one end of an intermediate member is received in an inner member pocket 210 at one angular position and the other end of the intermediate member is received in an outer member pocket 212 at another a different angular position.

In an illustrative embodiment, particularly adapted for use in a flywheel energy storage system, the inner and outer members of an illustrative heat transferring assembly 200 are ring shaped members having a thickness of about 0.010 inches and about 0.032 inches respectively, and also being configured so the ends of the intermediate members 206 are received therein. Additionally, the inner and outer members 202, 204 are composed of generally oxygen free copper. In a more specific embodiment, the inner member 203b and/or the outer member 204b are configured so each further comprises two layers 203a,b; 205a,b being secured to each other and each layer being ring shaped.

Also, the intermediate members 206 are each composed of a 10 or 11 gauge multi-stranded copper wire or copper cable, having for example about 44 copper strands or cables, such as New England Wire Part No. NER734040B. Each intermediate member 206 also subtends an angle of about 36 deg. end-to-end, when secured to and extending between the inner and outer members 202, 204. Further, the ends of each intermediate member 206 are secured to the inner and outer members 202, 204 by soldering using a high temperature solder for example. The above-described configuration and materials comprising the illustrative heat transferring assembly, yields an assembly in which radial, axial, and/or angular stiffness should not exceed, be less than or equal to, 50 lb./inch.

Figure 3A:
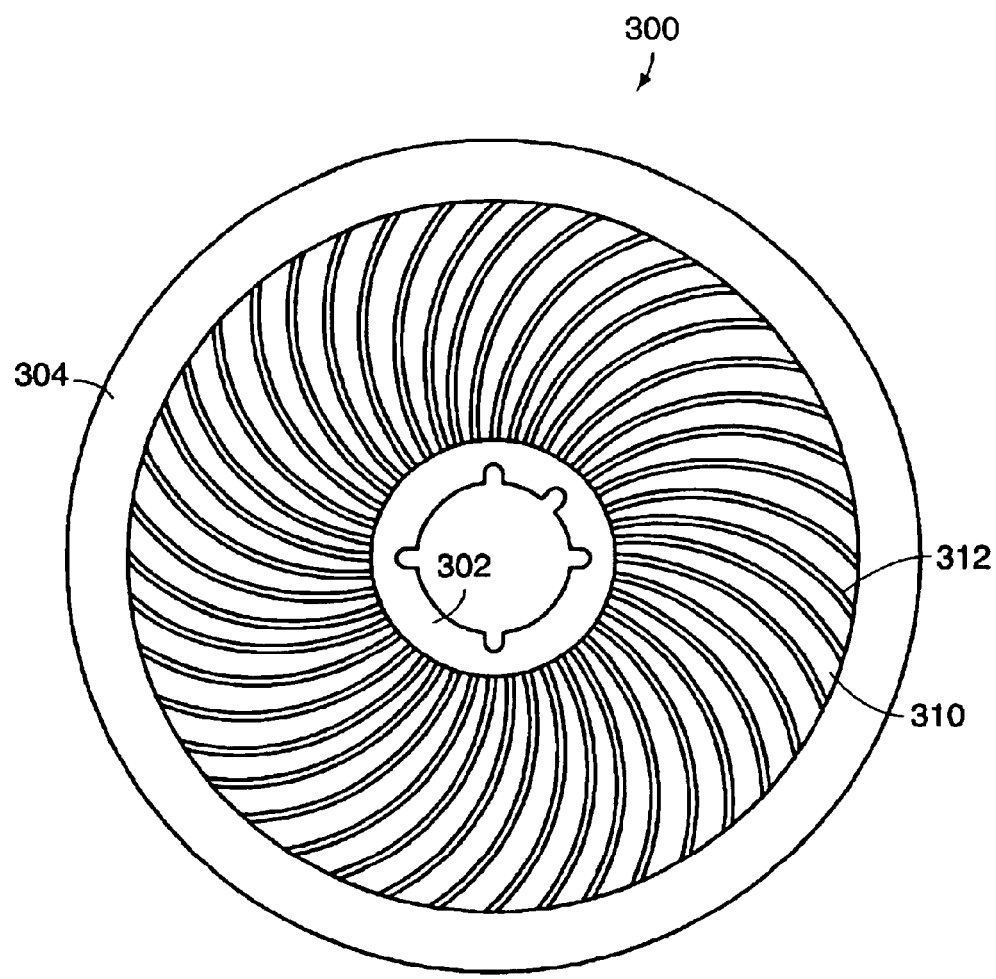
FIGS. 3A, B are a plan and side view, respectively, of a heat transferring assembly according to a second aspect of the present invention.

Now referring to FIGS. 3A, B there is shown a plan and side view respectively of a heat transferring assembly 300 according to a second aspect of the present invention. There also is shown in FIGS. 3C, D a section view of a portion of the heat transferring assembly according to the second aspect to illustrate various connecting schemes for the intermediate member.

The heat transferring assembly 300 according to the second aspect includes an inner member 302, an outer member 304 and at least one, more particularly a plurality, of intermediate planar members 306. The inner, outer and intermediate planar members 302–306 are each generally composed, at least in part, of a material that can receive and transfer heat energy, for example by conduction, and which are arranged and configured such that heat energy generated by a component, functionality, member or the like (i.e., heat source) of an apparatus/system and being received by the inner member 302 is communicated to the outer member 304 by each of the at least one intermediate planar member 306 and so that the heat energy being received by the outer member 204 from the intermediate planar member(s) is communicated to a heat sink and/or structure remote from the component, functionality, member or the like to be cooled. In the case of flywheel energy storage system such a remote structure comprises, for example, the grounding heat transfer part thereof.

The inner and outer members 302, 304 relate in great part to the corresponding members of the heat transfer device 200 according to the first aspect. Thus, reference shall be made to the above discussion for the inner and outer members 202, 204 of FIGS. 2A–D for further details concerning the materials, configuration, sizing and the like for the inner and outer members 302, 304 herein unless otherwise provided or described below.

Each intermediate planar member 306 extends between the inner and outer members 302, 304 and end segments 308 thereof are connected to the inner and outer members respectively using any of a number of techniques known to those skilled in the art. Also, the end segments 308 are each thermally connected to one of the inner member 302 and the outer member 304 so that heat energy in the inner member flows 302 flows into each intermediate planar member and so that this heat energy flows through the intermediate planar member 306, into the outer member 304 and thereby onto the remote structure/heat sink.

Each intermediate planar member 306 is generally planar in cross section and includes a plurality, more particularly a multiplicity of surface artifacts, such as the illustrated curved raised portions 312 and valleys 310. The provided surface artifacts cooperate so as to make the intermediate planar member 306 flexible in at least one of a radial direction or an axial direction, more particularly in both of these directions, more specifically flexible in the radial, axial and angular directions. Additionally, the thickness of the intermediate planar member 306 is set at a value to allow relative motion between the inner and outer members 302, 304. In one embodiment, the intermediate planar member 306 forms an annular element that is disposed in the area between the inner and outer members 302, 304 and extends along the inner circumference of the outer member and along the outer circumference of the inner member. In another embodiment, as illustrated in FIG. 3E, the intermediate planar member 306a is formed so as to include a plurality of segmental through apertures 320 extending between opposing surfaces of the intermediate planer member to further increase the flexibility of the intermediate planar member 306a.

Figure 3B:
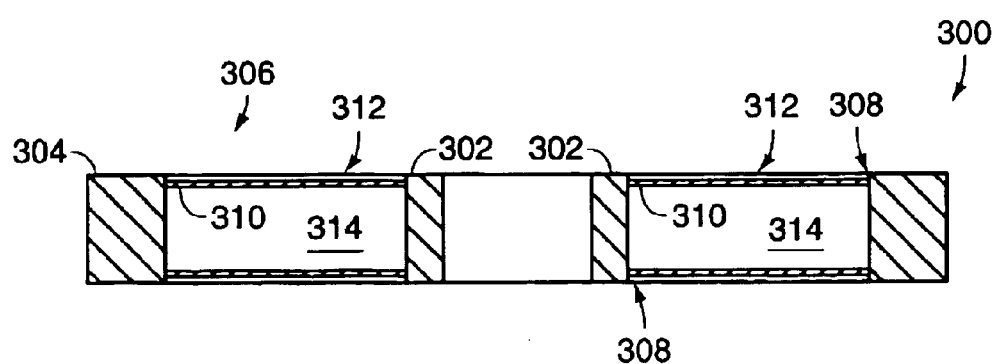
FIGS. 3C, D are section views of a portion of the heat transferring assembly according to the second aspect illustrating various connecting schemes for the intermediate member.
FIG. 3E is a plan view of an alternative embodiment of the heat transferring assembly of FIG. 3A.
Figure 3C:
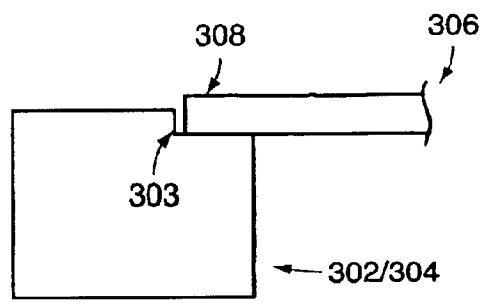
Figure 3D:
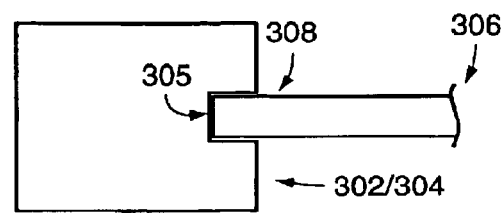
Figure 3E:
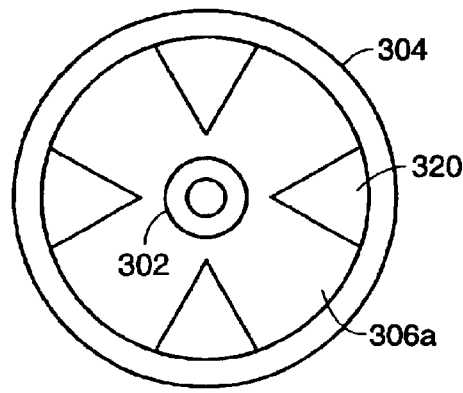

In the case where the heat transferring assembly 300 is arranged so as to include a plurality of intermediate planar members 306, as shown FIG. 3B, at least one of the intermediate planar members can be configured so as to include a plurality of through apertures. These through apertures communicate with the interior space 314 formed by the intermediate planar members 306 and the inner and outer members 302, 304. The number and size of the through apertures is set so that the pressure within the interior space 314 varies with the outside pressure (i.e., no differential pressure).

In yet another embodiment, the intermediate planar members 306 are configured and secured to the inner and outer members 302, 304 so the interior space 314 forms an annular compartment, the sides of which are formed by portions of the inner and outer members 320, 304. Any of a number of thermally conductive materials including fluids and solids is disposed in the interior space 314 and placed in thermal contact with the inner and outer members sides that form the interior space. The addition of the conductive material in the interior space 314 provides a mechanism to increase the heat transfer characteristics of the heat transferring assembly 300.

As noted above, and as illustrated in FIG. 3C, a corner portion of each of the inner and outer members 302, 304 is configured so as to include a step 303 in which is received the intermediate planar member end segment 308. The step 303 is sized so the end segment 308 can be secured thereto and so that there is a sufficient area available for transferring heat energy between the inner and outer members and the intermediate planar member 306. In another embodiment, the inner and outer radial members 302, 304 are configured so as to include an annular recess or groove 305 in the opposing radial surfaces thereof. The groove 305 is sized so the end segment 308 is secured therein and so that there is a sufficient area available for transferring heat energy between the inner and outer members and the intermediate planar member 306. The methods for mechanically and thermally connecting the end segments 308 to each of the inner and outer members, including any steps 303 or grooves 305 provided therein, include soldering, brazing, welding, adhesives, mechanical fixtures and clamping.

There is shown in FIGS. 4–5 various views of two embodiments of heat transferring assemblies according to a third aspect of the present invention. A heat transferring assembly according to the third aspect is particularly configured so as to be capable of handling an apparatus in which the heat generating device 4 and the portion of the heat sink 2 that is to receive the heat energy from the heat producing device are arranged so as to be spaced from each other in a generally axial direction.

Figure 4A:
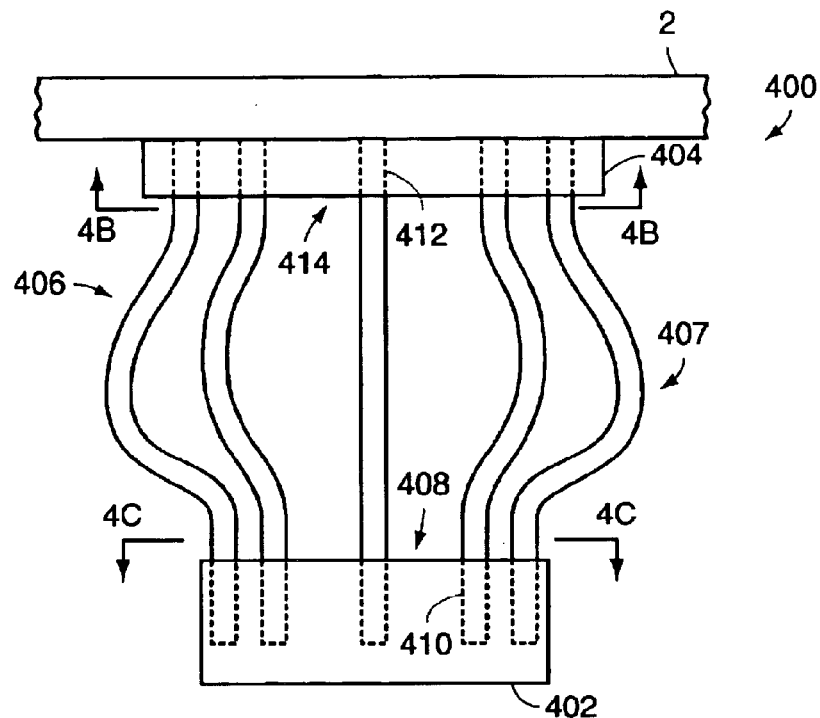
FIG. 4A is side view of a heat transferring assembly according to a third aspect of the present invention.
Figures 4B, 4C:
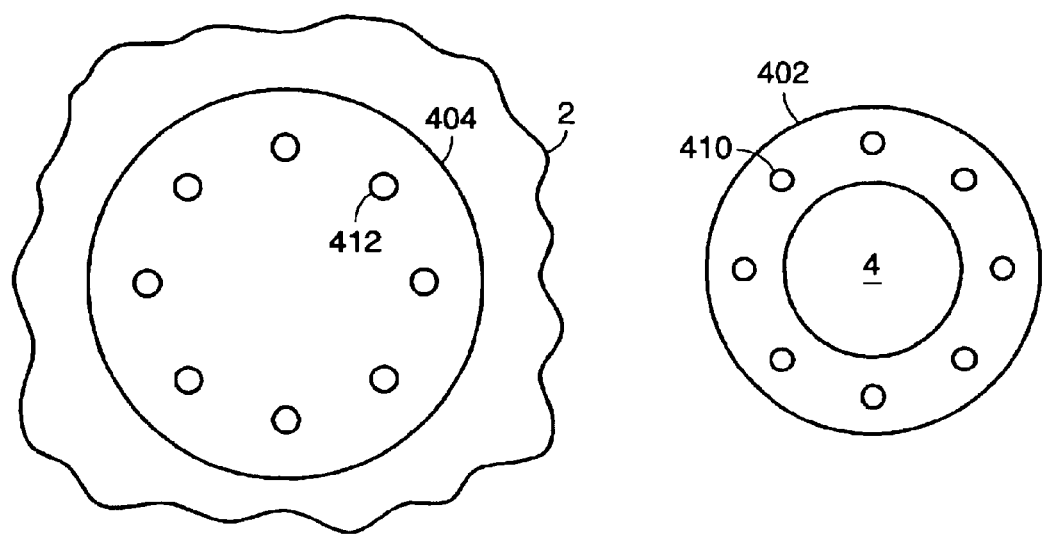
FIG. 4B is a plan view taken along line 4B—4B of FIG. 4A.
FIG. 4C is a plan view taken along line 4C—4C of FIG. 4A.

Now referring to FIGS. 4A–C there is shown a side view (FIG. 4A) of a heat transferring assembly 400 that includes a first member 402, a second member 404 and one or more, a plurality, or more particularly a multiplicity, of intermediate members 406. The first, second and intermediate members 402–406 are each generally composed, at least in part, of a material that can receive and transfer heat energy, for example by conduction, and which are arranged and configured such that heat energy generated by a component, functionality, member or the like of an apparatus/system and being received by the first member 402 is communicated to the second member 404 by each of the one or more/plurality/ multiplicity of intermediate members 406 and so that the heat energy being received by the second member 404 from the intermediate members is communicated to a heat sink and/or structure remote from the component, functionality, member or the like to be cooled. In the case of flywheel energy storage system such a remote structure comprises, for example, the grounding heat transfer part thereof. Reference shall be made to the foregoing discussion of FIGS. 2A–D regarding the inner, outer and intermediate members 202–206 for further details regarding the construction and make-up of the first, second and intermediate members 402–406 not otherwise provided or described in the following.

The first member 402 is configured so as to be placed in thermal engagement with the member, component or the like of an apparatus or system, such as the bearing assembly of a flywheel energy storage system, from which heat energy is to be withdrawn and communicated to a remote structure/ heat sink by means of the heat transferring assembly 400. More particularly, the first member 402 is configured and sized so as to provide a surface area that is sufficient for transferring heat energy to the first member from a structure disposed between the source and the first member or a structure making up a part of the source. In this regard, at least a portion of the heat energy being produced by the member, component or the like comprising the source of heat energy is communicated to the first member 402 for transfer to the remote structure/heat sink. In more particular embodiments, a majority of the heat energy being produced is communicated to the first member for transfer onto the remote structure/heat sink, more specifically, at least 50% or more of the heat energy and even more specifically about 80% or more of the heat energy is communicated for transfer to the remote structure/heat sink. The first member 402 also is generally configured and sized so it can be integrated with the other components of the apparatus or system such as a flywheel energy storage system. More specifically, a portion of the heat generating device (e.g., the outer race of a bearing assembly, is configured so as to receive the one or more intermediate members 406 therein.

In an exemplary embodiment, as illustrated in FIG. 4C, the first member 402 is configured as a ring shaped member which shape generally conforms to the corresponding cross-sectional shape of the bearing or other heat producing device from which heat energy is being communicated to the inner member. It is within the scope of the present invention, however, for other geometrical shapes such as polygons (e.g., octagons and the like) to be utilized and/or adapted for use as an first member 402 consistent with the characteristics and attributes desired for a heat transferring assembly 400 of the present invention such as the heat transfer properties thereof or providing for relative motion between the inner and outer members.

Similarly, the second member 404 is configured so as to be placed in thermal engagement with the remote structure or heat sink to which is dissipated the heat energy from the member, component or the like and communicated to the remote structure/heat sink by means of the heat transferring assembly 400. More particularly, the second member 404 is configured and sized so as to provide a surface area sufficient for transferring heat energy from the second member to the remote structure or heat sink. In an exemplary embodiment and as illustrated in FIGS. 4A–B, the second member 404 is configured as a flat circular member and so as to be generally concentric about the geometric center of the first member 402. It is within the scope of the present invention, however, for other geometrical shapes such as polygons (e.g., octagons and the like) to be utilized and/or adapted for use as a second member 404 consistent with the characteristics and attributes for a heat-transferring device 400 of the present invention. It also is within the scope of the present invention for the geometric shapes for each of the first and second members 402, 404 to be different from each other, which shapes are selected so as to yield a heat transferring assembly 400 having particular heat transfer and relative motion characteristics.

Each intermediate member 406 extends between the first member 402 and the second member 404 and the ends of each intermediate member are connected to the first and second members respectively using any of a number of techniques known to those skilled in the art. The ends of each intermediate member 406 also are each thermally connected to one of the first and second members 402, 404 so that heat energy in the first member 402 can flow into each intermediate member and so that this heat energy flows through each intermediate member, into the second member 404 and thereby onto the remote heat sink/structure.

Each intermediate member 406 is further configured and each intermediate member is arranged with respect to each of the first and second members 402, 404 such that the first and second members are movable with respect to each other in at least one direction, more particularly relative motion in at least two directions or dimensions (i.e., two axes), more specifically relative motion in three dimensions (i.e., three axes). More particularly, the configuration of these three members 402–406 and the arrangement of each intermediate member 406 are set so as to allow the first and second members 402, 404 to move with respect to each other in at least one of a radial, axial or angular direction, more specifically in both the axial and radial directions, more preferably in the axial, radial and angular directions. That is, each intermediate member 406 provides little structural stiffness (e.g., force per deflection) between the first and second members 402, 404. In more specific embodiments, the one or more, plurality or multiplicity of intermediate members 406 are configured and arranged so that the heat transferring assembly 400 has low spring constants in both the axial and radial directions, more particularly in the axial, radial and angular directions. In exemplary embodiments, such spring constants are generally in the range of from about 10 to about 1,000 lb/in, and more particularly in the range of from about 50 to about 200 lb/in. In the case of a flywheel energy storage system, such low spring constants provide a mechanism to prevent interactions between the heat transferring assembly 400 and other system components, such as for example, an active lift bearing.

In a more illustrative specific embodiment (e.g., see FIG. 4A), a portion 407 of each intermediate member 406 is arranged and configured to form an arc or a curved path between the first and second members 402, 404. Such a portion 407 coupled with the structural characteristics of the structure and material making each intermediate member 406, provides another mechanism such that the first and second members are movable with respect to each other as hereinabove described.

As noted above, the one or more, plurality or multiplicity of intermediate members 406 are mechanically and thermally connected to the first and second members 402, 404 using any of a number of techniques known to those skilled in the art. The specific technique or method for mechanically and thermally interconnecting each intermediate member 406 to the first and second members 402, 404 is dependent upon the materials comprising these three members, the structure or shape of these three members and the ability for that type of connection for allowing the heat energy to flow between the interconnected members. As illustration such techniques and methods include soldering, brazing, welding, clamping and adhesively securing.

In an exemplary embodiment (e.g., see FIGS. 4A–C) the first member 402 and the second member 404 are each configured so as to include therein one or more, a plurality, or more particularly a multiplicity, of recesses or pockets 410, 412, one pocket in each of the inner and outer member for each intermediate member 406. The inner member pockets 210 are circumferentially disposed from the geometric center in a top surface 408 of the first member 402 and the outer member pockets 412 are circumferentially disposed from the geometric center in a bottom surface 414 of the second member 404. The ends of the intermediate member 406 are received in the pockets 410, 412 of the first and second members 402, 404 and are secured therein using any of a number of techniques or methods as described herein.

Figure 5A:
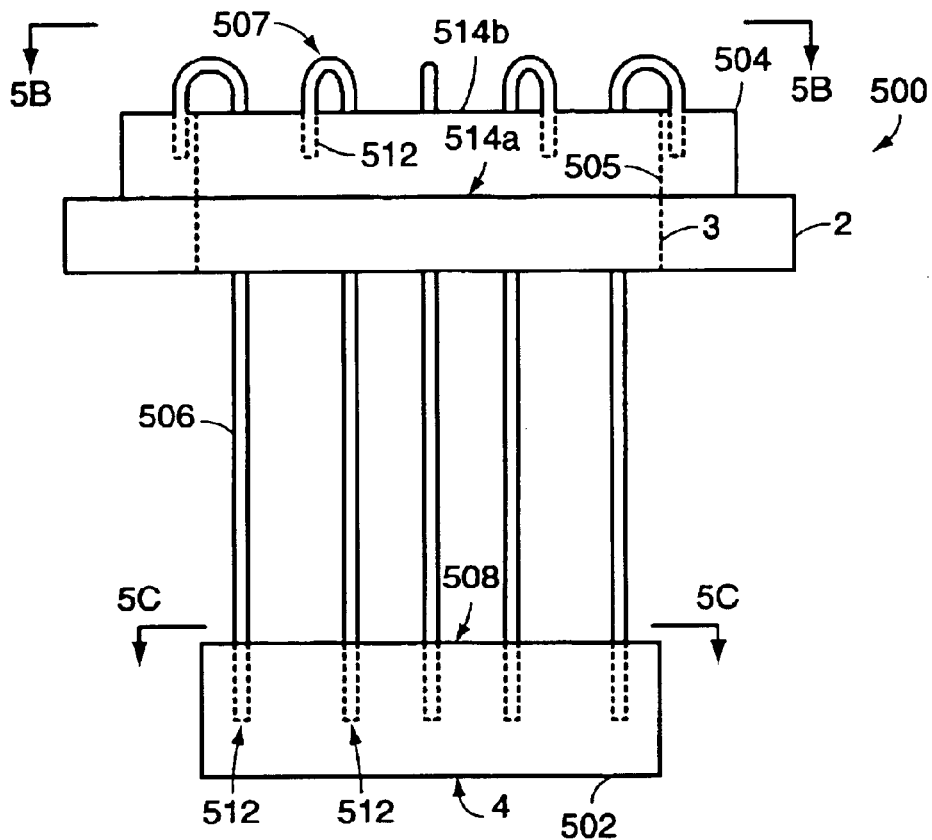
FIG. 5A is a side view of an alternative heat transferring assembly according to a third aspect.
Figure 5B:
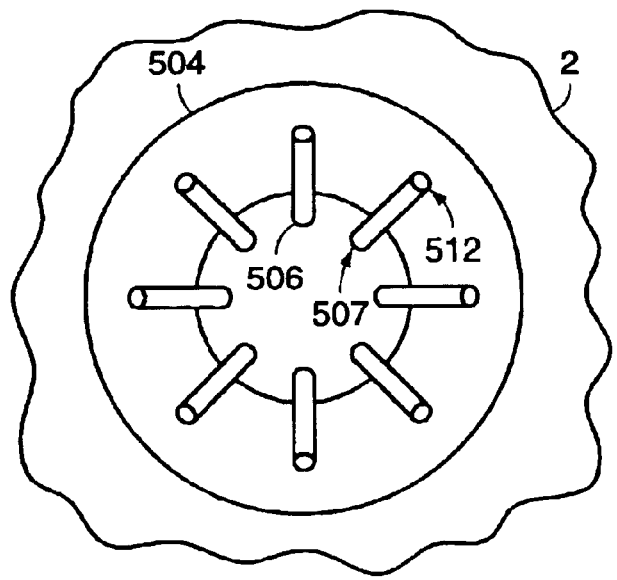
FIG. 5B is a plan view taken along line 5B—5B of FIG. 5A.
Figure 5C:
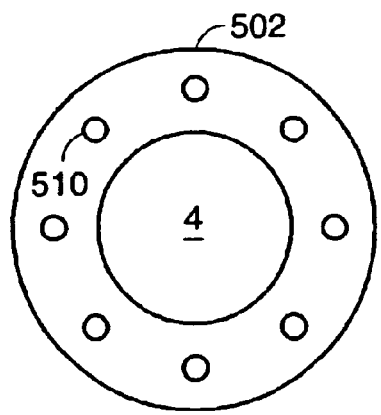
FIG. 5C is a plan view taken along line 5C—5C of FIG. 5A.

Now referring to FIGS. 5A–C there is shown a side view (FIG. 5A) of another heat transferring assembly 500 according to the third aspect that includes a first member 502, a second member 504 and one or more, a plurality, or more particularly a multiplicity, of intermediate members 506. The first, second and intermediate members 502–506 are each generally composed, at least in part, of a material that can receive and transfer heat energy, for example by conduction, and which are arranged and configured such that heat energy generated by a component, functionality, member or the like of an apparatus/system and being received by the first member 502 is communicated to the second member 504 by each of the one or more/plurality/multiplicity of intermediate members 506 and so that the heat energy being received by the second member from the intermediate members is communicated to a heat sink and/or structure remote from the component, functionality, member or the like to be cooled. In the case of flywheel energy storage system such a remote structure comprises, for example, the grounding heat transfer part thereof.

The first, second and intermediate members 502–506 generally relate to the corresponding elements or members of the heat transferring assembly 400 as shown in FIGS. 4A–C, hereinabove. Thus, reference shall be made to the above discussion for the first, second and intermediate members of 402–406 of FIGS. 4A–C as well as to the foregoing discussion of FIGS. 2A–D regarding the inner, outer and intermediate members 202–206 for further details regarding the construction, materials, configuration, sizing and the like for the first, second and intermediate members 402–406 not otherwise provided or described in the following.

In the illustrated embodiment, the first member 502 is configured so as to be placed in thermal engagement with the member, component or the like of an apparatus or system, such as the bearing assembly of a flywheel energy storage system, from which heat energy is to be withdrawn and communicated to a remote structure/heat sink by means of the heat transferring assembly 500. Similarly, the second member 504 is configured so as to be placed in thermal engagement with the remote structure or heat sink to which is dissipated the heat energy from the member, component or the like and communicated to the remote structure/heat sink by means of the heat transferring assembly 500. More particularly, the second member 504 is configured and sized so a bottom surface 514a thereof provides a surface area sufficient for transferring heat energy from the second member to the remote structure or heat sink. In an exemplary embodiment and as illustrated in FIG. 5B, the second member 504 is configured as ring shaped member and so as to be generally concentric about the geometric center of the first member 502. It is within the scope of the present invention, however, for other geometrical shapes such as polygons (e.g., octagons and the like) to be utilized and/or adapted for use as a second member 504 consistent with the characteristics and attributes for a heat-transferring device 500 of the present invention. It also is within the scope of the present invention for the geometric shapes for each of the first and second members 502, 504 to be different from each other, which shapes are selected so as to yield a heat transferring assembly 500 having particular heat transfer and relative motion characteristics.

Each intermediate member 506 extends between the first member 502 and the second member 504 and the ends of each intermediate member are connected to the first and second members respectively using any of a number of techniques known to those skilled in the art. More specifically, each intermediate member is configured and arranged so it extends from a top surface 508 of the first member 502 through an annular space or aperture 505 in the second member 504 and an aperture 3 in the structure the second member is attached to, and thence to a top surface 508b of the second member. The ends of each intermediate member 506 also are each thermally connected to one of the first and second members 502, 504 so that heat energy in the first member 502 can flow into each intermediate member and so that this heat energy flows through each intermediate member, into the second member 504 and thereby onto the remote heat sink/structure.

Each intermediate member 506 is further configured and each intermediate member is arranged with respect to each of the first and second members 502, 504 such that the first and second members are movable with respect to each other in at least one direction, more particularly relative motion in at least two directions or dimensions (i.e., two axes), more specifically relative motion in three dimensions (i.e., three axes). More particularly, the configuration of these three members 502–506 and the arrangement of each intermediate member 406 are set so as to allow the first and second members 502, 404 to move with respect to each other in at least one of a radial, axial or angular direction, more specifically in both the axial and radial directions, more preferably in the axial, radial and angular directions. That is, each intermediate member 406 provides little structural stiffness (e.g., force per deflection) between the first and second members 502, 504. In more specific embodiments, the one or more, plurality or multiplicity of intermediate members 506 are configured and arranged so that the heat transferring assembly 500 has low spring constants in both the axial and radial directions, more particularly in the axial, radial and angular directions. In exemplary embodiments, such spring constants are generally in the range of from about 10 to about 1,000 lb/in, and more particularly in the range of from about 50 to about 200 lb/in. In the case of a flywheel energy storage system, such low spring constants provide a mechanism to prevent interactions between the heat transferring assembly 500 and other system components, such as for example, an active lift bearing.

In a more illustrative specific embodiment (e.g., see FIG. 5A), a portion 507 of each intermediate member 506 is arranged and configured to form an arc or a curved path between the first and second members 502, 504. In addition to providing the structure for the above-described routing of each intermediate member 506 between the first and second members 502, 504, such a portion 507 coupled with the structural characteristics of the structure and material making each intermediate member 506, provides another mechanism such that the first and second members are movable with respect to each other as hereinabove described. In addition to including an arcuate portion 507 at the location illustrated in FIG. 5A, each intermediate member 506 also is configurable to include another arcuate portion 407 in the generally axially extending region of the intermediate member as illustrated in FIG. 4A.

As noted above, the one or more, plurality or multiplicity of intermediate members 506 are mechanically and thermally connected to the first and second members 502, 504 using any of a number of techniques known to those skilled in the art. The specific technique or method for mechanically and thermally interconnecting each intermediate member 506 to the first and second members 502, 504 is dependent upon the materials comprising these three members, the structure or shape of these three members and the ability for that type of connection for allowing the heat energy to flow between the interconnected members. As illustration such techniques and methods include soldering, brazing, welding, clamping and adhesively securing.

In an exemplary embodiment (e.g., see FIGS. 5A–C) the first member 502 and the second member 504 are each configured so as to include therein one or more, a plurality, or more particularly a multiplicity, of recesses or pockets 510, 512, one pocket in each of the inner and outer member for each intermediate member 506. The first member pockets 510 are circumferentially disposed from the geometric center in a top surface 508 of the first member 502 and the outer member pockets 512 are circumferentially disposed from the geometric center in a top surface 514b of the second member 504. The ends of the intermediate member 506 are received in the pockets 510, 512 of the first and second members 502, 504 and are secured therein using any of a number of techniques or methods as described herein.

Figure 6:
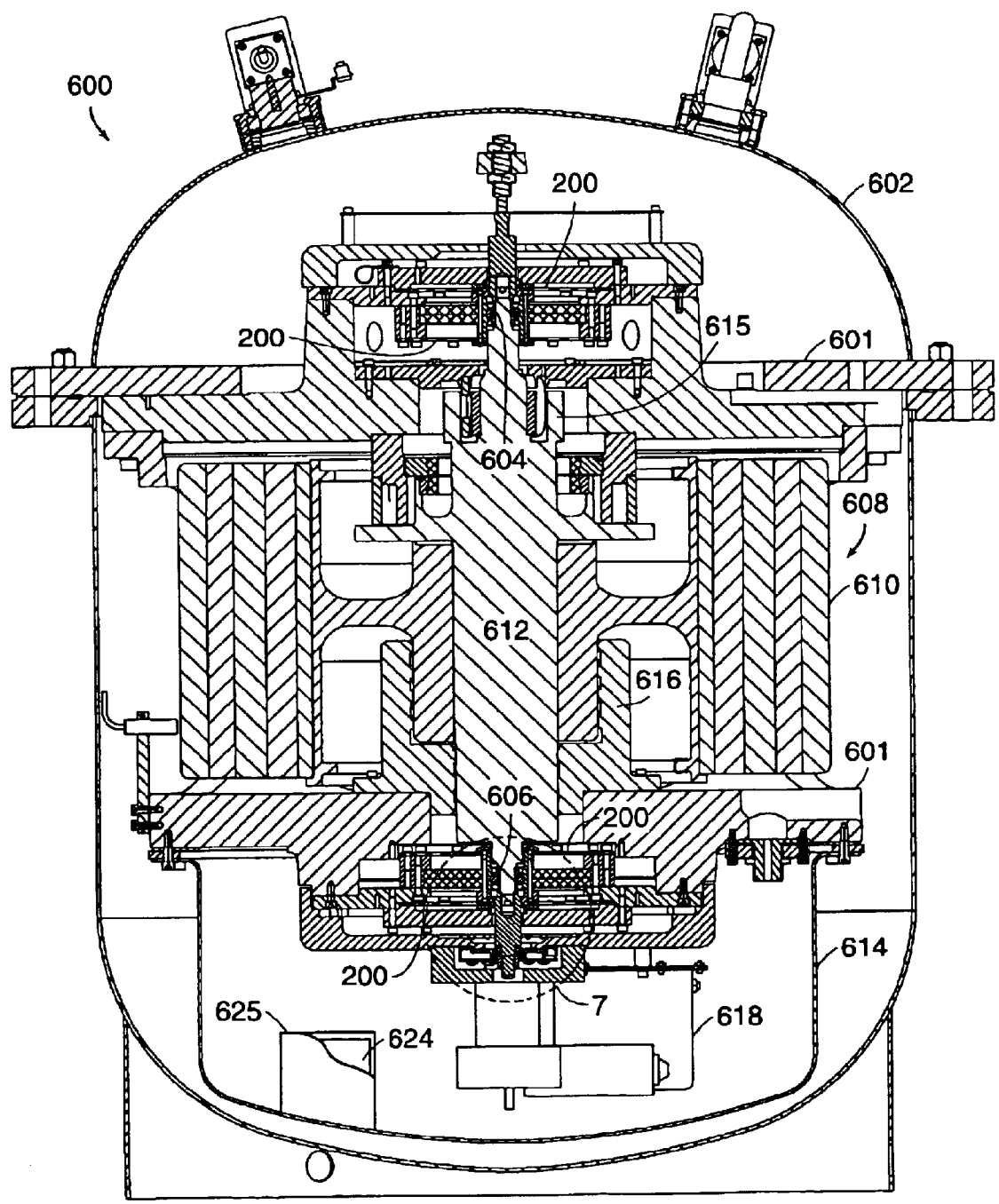
FIG. 6 is a cross sectional view of a flywheel energy storage system having a heat transferring assembly according to the present invention for dissipating heat energy of the bearing(s) thereof.
Figure 7:
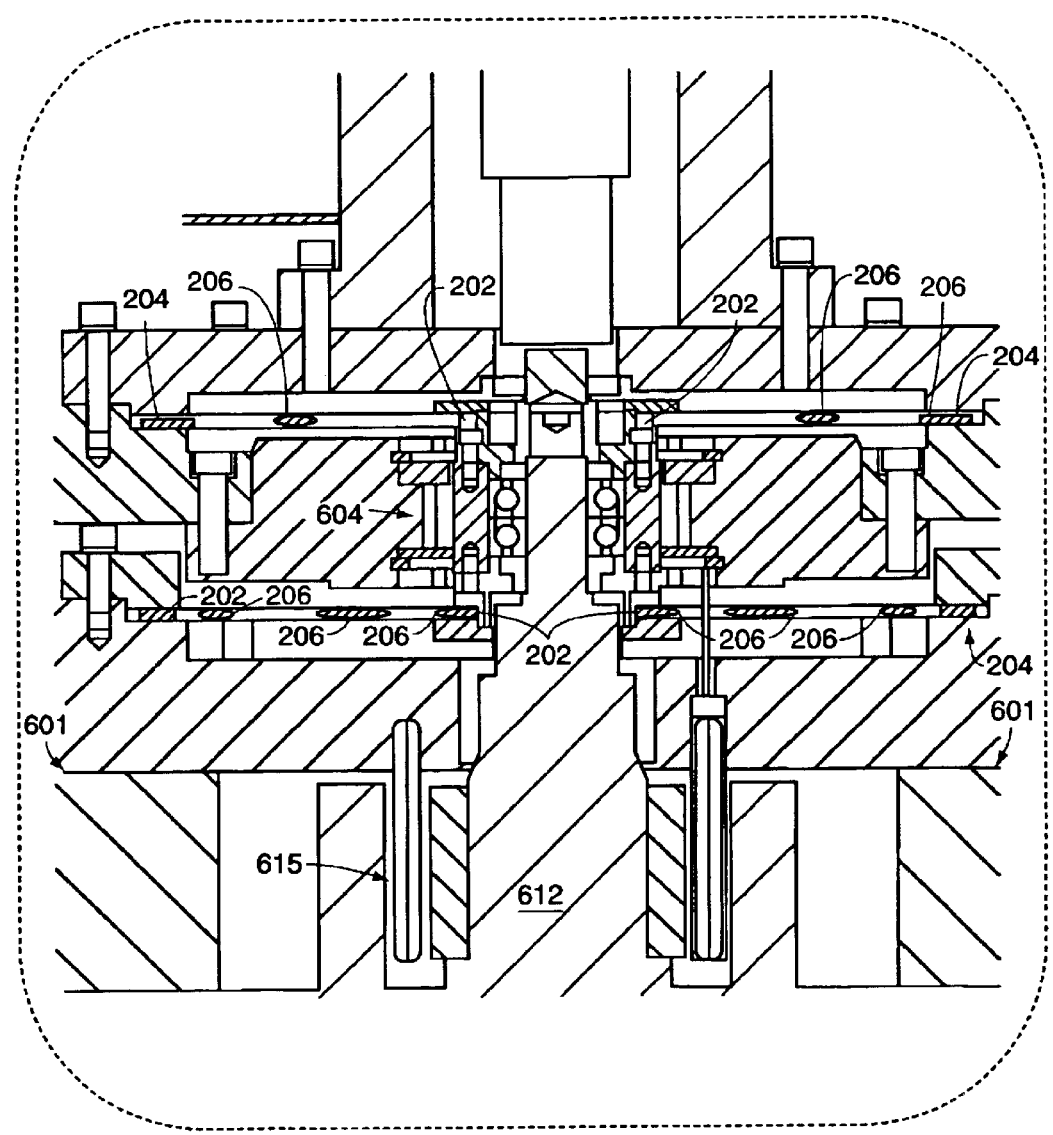
FIG. 7 is an expanded cross sectional view of a flywheel energy storage system to further illustrate the heat transferring assembly for dissipating heat energy of a bearing assembly thereof.
Figure 8:
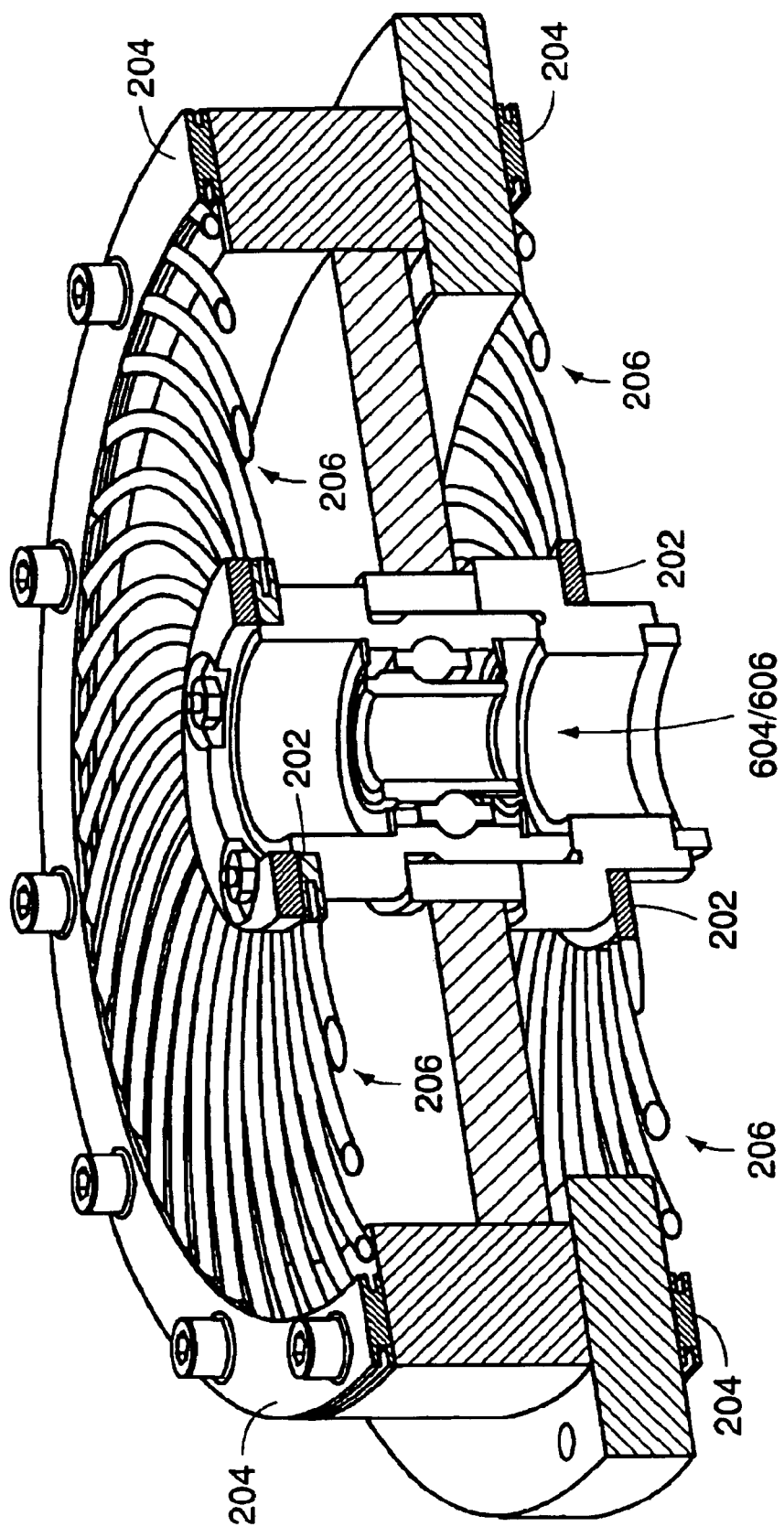
FIG. 8 is an isometric cross-sectional view proximal a bearing assembly for a flywheel energy storage system to further illustrate the details of a heat transferring assembly and its usage.

Now referring to FIGS. 6–7, there is a cross-sectional view of a flywheel energy storage system 600 embodying one or more heat transferring assemblies 200 according to the present invention (FIG. 6) and an expanded view of the flywheel energy storage system so to further illustrate the heat transferring assembly 200 embodied therein (FIG. 7). There also is shown in FIG. 8 an isometric cross-sectional view proximal a bearing assembly of a flywheel energy storage system 600 that further illustrates details of the heat transferring assembly 200 and its usage. Although FIGS. 6–8 illustrate an embodiment of a heat transferring assembly 200 according to the first aspect of the present invention, it is within the scope of the present invention for any embodiment of any heat transferring assembly according to any aspect to be utilized in a flywheel energy storage system. Although these figures illustrate usage of a heat transferring assembly to dissipate at least a portion of the heat energy of a bearing assembly of a flywheel energy storage system, this shall not be construed as limiting the scope of the present invention. It is within the scope of the present invention to adapt a heat transferring assembly to dissipate heat energy from any heat producing source (e.g., motor) of a flywheel energy storage system or for heat producing components of any apparatus or system, where the heat producing components or heat sources are located remote from a heat sink or the heat dissipating mechanism of the system or apparatus.

The illustrative flywheel energy storage system 600 includes a main housing 602, which is suitably sealed to maintain gas pressure therein at or below a predetermined level of vacuum for optimal performance of the flywheel energy storage system. Operatively disposed in the main housing 602 is a flywheel assembly 608, which includes a shaft 612 coupled between upper and lower bearings 604, 606. The flywheel assembly 608 also includes a plurality of flywheel rotors 610, each typically about 12 inches in diameter, which are coupled to the shaft 612. Also, the predetermined gas pressure level maintained in a space bounded by the main housing 602 typically is at a near-vacuum, thereby minimizing drag on the flywheel rotors 610 and reducing windage losses during operation of the flywheel system 600. Reference also should be made to U.S. Ser. No. 09/606,724 and PCT Application Number PCT/US01/20627, the teachings of which are incorporated herein by reference, for other details and features of the illustrated flywheel energy storage system 600 not otherwise provided herein.

The flywheel assembly 608 further includes at least one heat transferring assembly 200 for each of the upper and lower bearings 604, 606. In the illustrated embodiment, two heat transferring assemblies 200 are provided for each bearing, an upper heat transferring assembly 200 and a lower heat transferring assembly 200 that are axially displaced from each other so as to be proximal the axial ends of each bearing assembly. In this way, heat energy from each end of the bearing is dissipated to the remote heat sink. Reference shall be made to the foregoing discussion regarding FIGS. 1–5 for further details regarding the heat transferring assembly or functional elements thereof not otherwise provided or described below.

As more clearly shown in FIGS. 7, and 8 each heat transferring assembly comprises an inner member 202, an outer member 204 and intermediate members 206. In the embodiment, illustrated in FIG. 7 the intermediate members 206 are arcuate. It should be noted that in the embodiment illustrated in FIG. 7, the cross-sectional view proximal the inner and outer members 202, 204 in some cases includes a portion of the intermediate member(s) 206.

The inner member 202 of the upper and lower heat transferring assemblies is disposed in the flywheel assembly 608 such that each inner member is proximal to either of the upper or lower bearing 604, 606. Each inner member 202 also is arranged in the flywheel assembly 608 so it is in thermal engagement or thermally coupled or connected to the upper bearing 604 such that at least a portion of the heat energy being generated by the upper bearing 604 is communicated to the inner member. Correspondingly, the outer member 204 of the upper and lower heat transferring assemblies 200 is disposed in the flywheel assembly 608 such that each outer member is in thermal engagement or thermally coupled or connected to the support members 601. Thus, heat energy from the inner member 202 being communicated to the outer member 204 via the intermediate members 206 is dissipated to the support members 601. This heat energy in turn is communicated to the housing 602 and thence to the external heat sink to which the housing is in thermal engagement with or thermally coupled.

With the foregoing structure, each heat transferring assembly 200 is arranged so that one end of it is proximal the source of the heat energy and the other end is proximal a structure of the flywheel energy storage system 600 that is remote from the source of heat energy. Consequently each heat transferring assembly 200 thus in effect thermally bypasses a portion of the interior structure of the flywheel energy storage system 600. As such, the heat transferring assembly provides a thermal path that easily conducts or communicates at least a portion of the heat energy being produced by the heat source to the remote structure of the flywheel energy storage system. As a consequence, heat energy of a bearing for example is more readily communicated to the heat sink, thereby making more optimal the operational conditions of the bearing.

In addition, and as indicated above, the heat transferring assembly 200 of the present invention also is constructed so as to allow axial and radial movement, more particularly axial, radial and angular movement, between and with respect to the inner and outer members 202, 204. Consequently, this prevents an interaction of the heat transferring assembly 200 with at least the active lift bearing of the flywheel energy storage system. In other words, when one or more transferring assemblies are used to cool the bearing(s) or bearing assembly of a flywheel energy storage system 600, the heat transferring assembly 200 of the present invention provides a mechanism or heat transfer path by which the flywheel bearing or bearing assembly is directly, thermally coupled to the grounded heat transfer part of the system yet allows the shaft or rotor to be magnetically levitated without imposing excessive axial or radial forces. As also noted above, the heat transferring assembly 200 provides a direct heat transfer path for removing at least a portion of the heat energy from mechanical bearings, magnets or electromagnets of magnetic bearings or any other non-rotating parts, which require a predetermined amount of radial and axial stiffness, especially in a system being in a vacuum environment. In the case of a mechanical bearing the configuration and arrangement of a heat transferring assembly according to the present invention can be set so as to provide an anti-rotation capability for the outer race of a mechanical bearing.

In a particularly illustrative embodiment, the inner member 202 and the outer member 204 of each heat transferring assembly 200 are ring shaped members having a thickness of about 0.010 inches and about 0.032 inches respectively, and also being configured so the ends of the intermediate members 206 are received therein. Further, the inner and outer members 202, 204 are composed of generally oxygen free copper. In a more specific embodiment, the inner member 202 and the outer member 204 are configured so as to further comprise two layers 203 *a,b*; 205*a,b* (FIG. 2D) being secured to each other and each layer being ring shaped. This illustrative embodiment, however, shall not be construed as limiting the inner and outer members 202, 204 of the present invention to the illustrative thicknesses, constitution or construction as it is within the scope of the present invention, as herein provided, for the inner and outer members to be configured in any of a number of ways (e.g., made using thicker materials) consistent with the teachings of the present invention.

The intermediate members 206 are each composed of a 10–11 gauge multi-stranded copper wire or copper cable, having for example about 44 copper strands or copper cables, such as New England Wire Part No. NER734040B. Each intermediate member 206 also subtends an angle of about 36 deg. end-to-end, when secured to and extending between the inner and outer members 202, 204. Further, the ends of each intermediate member 206 are secured to the inner and outer members 202, 204 by soldering using a high temperature solder for example. The above-described configuration and materials comprising the illustrative heat transferring assembly, yields an assembly in which radial and axial stiffness, more particularly the radial, axial and angular stiffness, should not exceed, be less than or equal to, 50 lb./inch.

The main housing 602 is made of any suitable material, e.g., high strength steel known in the art which at least can provide a very high integrity hermetic seal to prevent leakage of ambient gases into the vacuum established within the main housing. Similarly, the flywheel assembly 608 comprises any suitable material for the intended use. For example, the flywheel rotors 610 and the shaft 612 are made of high strength steel. Alternatively, the flywheel rotors 610 may be made of any suitable fiber composite materials, e.g., fiberglass, carbon, or KEVLAR™ filament material (which is sold by and a trademark of the E. I. DuPont Co., Inc., Wilmington, Del., USA) wound with a suitable resin binder.

As those skilled in the art will understand, a variety of designs can be used for the main housing 602 and the flywheel assembly 608. The primary concerns being strength and stability under load, and providing a very high integrity hermetic seal to prevent leakage of ambient gases into the vacuum support and bearing system. Accordingly, a variety of specific structures can be adapted for use to provide the main housing 602 and the flywheel assembly 608.

In the illustrative embodiment, the flywheel assembly 608 is disposed within the main housing 602 between the support members 601; and, a gas storage chamber 614 is sealingly coupled to the support members 601. As a result, another space is defined by an inner surface of the gas storage chamber 614 and lower surfaces of the support members 601. Further, a portion of the shaft 612 and the lower bearing 606 are positioned in that defined space through an orifice formed through the support members; and, a high-speed motor 615, which may have a maximum rotational speed of, e.g., about 8000 radians per second for driving the shaft 612 of the high-speed flywheel assembly 608, is disposed in the gas storage chamber 614. The gas pressure within the gas storage chamber 614 is maintained at a level that is significantly higher than the near-vacuum gas pressure level surrounding the flywheel assembly 608 within the main housing 602.

Specifically, the gas pressure within the gas storage chamber 614 is maintained at the significantly higher level by a drag pump 616, which may be implemented as, e.g., a conventional turbo-molecular pump or a conventional molecular drag pump. In the illustrated embodiment, the drag pump 616 is integrated into the design of the flywheel assembly 608. As a result, the high-speed motor 615, the shaft 612, and the upper and lower bearings 604, 606 of the flywheel assembly 608 are used to power the drag pump 616, thereby obviating the need for a separate motor to power the drag pump 616. Accordingly, the shaft 612 of the flywheel assembly 608 is integrated with the structure of the drag pump 616 and provides the power required for operating the drag pump 616. The drag pump 616 further includes helical grooves for providing a flow path for movement of gases from the main housing 602 to the gas storage chamber 614. As a result, the drag pump 616 operates to maintain an upstream pressure level, P1, within the main housing 602, which is preferably near vacuum; and, a downstream pressure level, P2, within the gas storage chamber 614, where P2 is significantly greater than P1.

In the illustrative embodiment, the flywheel energy storage system 600 further includes at least one pump disposed within the gas storage chamber 614. In an exemplary embodiment, this at least one pump comprises a getter pump 618 and a water sorbent 624 that are disposed inside the gas storage chamber 614. The getter pump 618 and the water sorbent 624 are preferably arranged in parallel inside the gas storage chamber 614, thereby simultaneously absorbing substantially all of the gases pumped from the enclosure of the main housing 602 to the gas storage chamber 614 by the drag pump 616 for ensuring that the downstream pressure, P2, is maintained at an acceptable level. The getter pump 618 and the water sorbent 624 also simultaneously absorb any gases that might evolve from the high-speed motor 615 and other portions of the flywheel energy storage 600 disposed inside the gas storage chamber 614.

For example, gases that evolve from the flywheel assembly 608 and the other portions of the flywheel energy storage system 600 may include water vapor, and various types of hydrocarbons and other active gases. Such gases commonly evolve from flywheel assemblies that are made using, e.g., fiber composite materials and operate at high-speeds. The parallel combination of the getter pump 618 and the water sorbent 624 provides a low-cost way of removing these different types of gases from the gas storage chamber 614, thereby preventing an unacceptable build-up of the downstream pressure, P2, inside the gas storage chamber 614.

In an illustrative embodiment, the water sorbent 624 is disposed within a container 625, which container is preferably configured and arranged with an open structure so that gases including water vapor have easy access to the water sorbent while preferably containing the water sorbent so that it does not spread over the inside space of the gas storage chamber 614. In an exemplary embodiment, calcium oxide (CaO) is used as the water sorbent 624 and such material is contained in porous packets such as packets made of Tyvek material. The foregoing is illustrative and other water sorbents as well as other mechanisms and techniques for housing the water sorbent, including those described in the above identified U.S. and PCT patent applications, are contemplated for use with the present invention.

Although a preferred embodiment of the invention has been described using specific terms, such description is for illustrative purposes only, and it is to be understood that changes and variations may be made without departing from the spirit or scope of the following claims.

What is claimed is:

1. A heat transferring device for thermally communicating heat energy being produced by a rolling-element bearing for a rotating shaft of one of an apparatus or system to a heat sink, where the heat energy being generated by the rolling-element bearing is un-useable heat energy with respect to the apparatus or system, said heat transferring device comprising:

a plurality of flexible thermally conductive members, where a first end of each of the plurality of flexible thermally conductive members is thermally coupled to the rolling element bearing and where a second end of each of the plurality of flexible thermally conductive members is thermally coupled to the heat sink.

2. The heat transferring device of claim 1, wherein each of the plurality of flexible thermally conductive members is configured and arranged so that at least some of the heat energy being generated by the rolling element bearing is communicated to the heat sink.

3. The heat transferring device of claim 2 wherein each of the plurality of flexible thermally conductive members is configured and arranged so that a majority of the heat energy being generated by the rolling element bearing for the rotating shaft is communicated to the heat sink via the heat transferring device.

4. The heat transferring device of claim 2 wherein each of the plurality of flexible thermally conductive members is configured and arranged so that one of at least 50% or 80% of the heat energy being generated by the rolling-element bearing is communicated to the heat sink via the heat transferring device.

5. The heat transferring device of claim 1, wherein each of the plurality of flexible thermally conductive members is configured and arranged so as to allow relative motion between the rolling-element bearing and a portion of the heat sink.

6. The heat transferring device of claim 2, wherein each of the plurality of flexible thermally conductive member is configured and arranged so as to allow relative motion between the rolling-element bearing and a portion of the heat sink.

7. The heat transferring device of either of claim 5 or 6, wherein the relative motion being allowed is in one of in one direction, in two directions or in three directions.

8. The-heat transferring device of either of claim 5 or 6, wherein the relative motion being allowed between the rolling-element bearing and the heat sink is in at least one of a radial direction, an axial direction, or an angular direction with respect to the rolling element bearing.

9. The heat transferring device of claim 1, wherein each of the plurality of flexible thermally conductive members is comprised of a plurality or more of flexible elements.

10. The heat transferring device of claim 1, further comprising:

a first thermally conductive member being configured and arranged to thermally couple the first end of each of the plurality of flexible thermally conductive members to the rolling-element bearing for the rotating shaft; and a second thermally conductive member being configured and arranged to thermally couple the second end of each of the plurality of flexible thermally conductive members to the heat sink.

11. The heat transferring device of claim 1, wherein each of the plurality of flexible thermally conductive member is comprised of a thermally material that is at least one of copper, aluminum, silver and carbon.

12. The heat transferring device of claim 10, wherein the first thermally conductive member and the second thermally conductive member are arranged such that each of the plurality of flexible thermally conductive members extends there between in on of a generally radial direction or a generally axially direction with respect to the rolling-element bearing for the rotating shaft.

13. The heat transferring device of claim 12, wherein at least a portion of each of the plurality of flexible thermally conductive members extending there between is arcuate.

14. The heat transferring device of claim 10, wherein each of the first and second thermally conductive members comprises a thermally conductive material that is at least one of copper, aluminum, silver and carbon.

15. The heat transferring device of claim 9, wherein each of the plurality of flexible thermally conductive members is a flexible multi-strand cable, where one or more strands is made from a thermally conductive material.

16. A heat transferring device for thermally communicating heat energy being produced by a rolling-element bearing for a rotating shaft of one of an apparatus or system to a heat sink, where the heat energy being generated by the rolling-element bearing is un-useable heat energy with respect to the apparatus or system said heat transferring device comprising:

a flexible thermally conductive member, a first end of which is thermally coupled to the rolling-element bearing for the rotating shaft, and a second end of which is thermally coupled to the heat sink, wherein the flexible thermally conductive member is comprised of a plurality or more of flexible elements.

17. A heat transferring device for thermally communicating heat energy being produced by a rolling-element bearing for a rotating shaft of one of an apparatus or system to a heat sink, where the heat energy being generated by the rolling-element bearing is un-useable heat energy with respect to the apparatus or system, said heat transferring device comprising:

a flexible thermally conductive member, a first end of which is thermally coupled to the rolling-element bearing for the rotating shaft, and a second end of which is thermally coupled to the heat sink, wherein the flexible thermally conductive member is a flexible multi-strand cable, where one or more strands is made from a thermally conductive material.

18. The heat transferring device of either of claim 16 or claim 17, wherein the flexible thermally conductive member is configured and arranged so that at least some of the heat energy being generated by the rolling element bearing is communicated to the heat sink.

19. The heat transferring device of either of claim 16 of claim 17, wherein the flexible thermally conductive member is configured and arranged so as to allow relative motion between the rolling-element bearing and a portion of the heat sink.

20. The heat transferring device of either or claim 16 or claim 17, wherein the flexible thermally conductive member is configured and arranged so as to allow relative motion between the rolling-element bearing and a portion of the heat sink.

21. A heat transferring device for thermally communicating heat energy being produced by a rolling element bearing for a rotating shall of one of an apparatus or system to a heat sink, where the heat energy being generated by the rolling-element bearing is un-useable heat energy with respect to the apparatus or system, said heat transferring device comprising:

a first thermally conductive member that is thermally coupled to the rolling element bearing for the rotating shaft;

a second thermally conductive member that is thermally coupled to the heat sink;

plurality of third thermally conductive members, where a first end of each of the plurality of third thermally conductive members is thermally coupled to the first thermally conductive member and where a second end of each of the plurality of third thermally conductive members is thermally coupled to the second thermally conductive member;

wherein each of the plurality of third thermally conductive members is configured and arranged so that a majority of the heat energy being generated by the rolling-element bearing for the rotating shaft is communicated to the heat sink via the first, third and second conductive members respectively; and wherein each of the plurality of third thermally conductive members is a flexible member that is configured and arranged so as to allow relative motion between the first and second thermally conductive members.

22. The heat transferring device of claim 21 wherein the plurality of third thermally conductive members are configured and arranged so that one of at least 50% or 80% of the heat energy being generated by the rolling element bearing for the rotating shaft is communicated to the heat sink via the heat transferring device.

23. The heat transferring device of claim 21, wherein the relative motion being allowed is in one of in one direction, in two directions or in three directions.

24. The heat transferring device of claim 21, wherein the relative motion between the first and second thermally conductive members is in at least one of a radial direction, an axial direction, or an angular direction with respect to the rolling-element bearing for the rotating shaft.

25. The heat transferring device of claim 21, wherein the first thermally conductive member and the second thermally conductive member are arranged such that each of the plurality of third thermally conductive members extends therebetween in one of a generally radial direction or a generally axially direction.

26. The heat transferring device of claim 21, wherein at least a portion of each of the plurality of thermally conductive members extending therebetween is arcuate.

27. The heat transferring device of claim 24, wherein each of the plurality of third thermally conductive members is configured and arranged so as to have spring constants in each of the axial, radial, and angular directions that are equal to or less than a desired value for each of the axial, radial and angular directions.

28. The heat transferring device of claim 21, wherein each of the plurality of third thermally conductive elements is a flexible multi-strand cable, each strand be made from a thermally conductive material.

29. A heat transferring device for thermally communicating heat energy being produced by a rolling element bearing for a rotating shaft of one of an apparatus or system to a heat sink, where the heat energy being generated by the rolling-element hearing is un-useable heat energy with respect to the apparatus or system, said heat transferring device comprising:

a first thermally conductive member that is thermally coupled to the rolling element bearing for the rotating shaft;

a second thermally conductive member that is thermally coupled to the heat sink; and a third thermally conductive member, a first end of which is thermally coupled to the first thermally conductive member and a second end of which is thermally coupled to the second thermally coupled conductive member, wherein said third thermally conductive member comprises a plurality or more of flexible thermally conductive elements, each conductive element extending between, and being thermally coupled to, the first and second thermally conductive members.

30. A heat transferring device for thermally communicating heat energy being produced by a rolling-element bearing for a rotating shaft of one of an apparatus or system to a heat sink, where the heat energy being generated by the rolling-element bearing is un-useable heat energy with respect to the apparatus or system, said heat transferring device comprising:

a first thermally conductive member that is thermally coupled to the rolling-element bearing;

a second thermally conductive member that is thermally coupled to the heat sink;

a plurality or more of third thermally conductive members, a first end of each of the plurality of third thermally conductive members being thermally coupled to the first thermally conductive member and a second end of each of the plurality of third thermally conductive members being thermally coupled to the second thermally coupled conductive member;

wherein each of the plurality of third thermally conductive members is configured and arranged so that a majority of the heat energy being generated by the rolling element bearing is communicated to the heat sink via the first thermally conductive members, the plurality of third thermally conductive members and the second conductive member respectively; and wherein each of the plurality of third thermally conductive members is configured and arranged so as to yield a structure that allows relative motion between the first and second thermally conductive members.

31. The heat transferring device of claim 30 wherein each of the plurality of third thermally conductive members is configured and arranged so that one of at least 50% or 80% of the heat energy being generated by the rolling-element bearing is communicated to the second thermally conductive member via the plurality of third thermally conductive members.

32. The heat transferring device of claim 30, wherein the structure yielded allows relative motion in one of in one direction, in two directions or in three directions.

33. The heat transferring device of claim 30, wherein the structure yielded allows relative motion in at least one of a radial direction, an axial direction, or an angular direction.

34. The heat transferring device of claim 33, wherein the structure yielded has spring constants in each of the axial, radial and angular directions that are equal to or less than a desired value for each of the axial, radial and angular directions.

35. An apparatus including a rotating member comprising:

a rolling-element bearing that rotatbly supports the rotating member and that generates un-useable heat energy with respect to the apparatus;

a heat transferring device including a plurality of flexible thermally conductive members, where a first end of each of the plurality of flexible thermally conductive members is thermally coupled to the rolling element bearing and where a second end of each of the plurality of flexible thermally conductive members is thermally coupled to a heat sink.

36. The apparatus of claim 35, wherein the plurality of flexible thermally conductive members are configured and arranged so that at least some of the heat energy being generated by the rolling-element bearing that rotatbly supports the rotating member is communicated to the heat sink.

37. The apparatus of claim 35, wherein the plurality of flexible thermally conductive members are configured and arranged so as to allow relative motion between the rolling-element bearing and a portion of the heat sink.

38. The apparatus of claim 37, wherein the relative motion being allowed is in one of in one direction, in two directions or in three directions.

39. The apparatus of claim 37, wherein the relative motion being allowed is in at least one of a radial direction, an axial direction, or an angular direction with respect to the rolling-element bearing.

40. A flywheel energy storage system comprising:

a flywheel;

a shaft to which is secured the flywheel;

at least one bearing assembly that rotatably supports the shaft;

a heat sink;

a heat conduction device for said at least one bearing assembly, the heat conduction device including a flexible thermally conductive member, a first end of which is thermally coupled to the at least one bearing assembly, and a second end of which is thermally coupled to a heat sink; and wherein the flexible thermally conductive member is comprised of a plurality or more of flexible elements.

41. The flywheel energy storage system of claim 40, wherein the flexible thermally conductive member is configured and arranged so that at least some of the heat energy being generated by the at least one bearing assembly is communicated to the heat sink.

42. The flywheel energy storage system of claim 41, wherein the flexible thermally conductive member is configured and arranged so that a majority of the heat energy being generated by the bearing assembly is communicated to the heat sink heat conduction device.

43. The flywheel energy storage system of claim 41 wherein the flexible thermally conductive member is configured and arranged so that one of at least 50% or 80% of the heat energy being generated by the bearing assembly is communicated to the heat sink via the heat conduction device.

44. The flywheel energy storage system of claim 40, wherein the flexible thermally conductive member is configured and arranged so as to allow relative motion between the at least one bearing assembly and a portion of the heat sink.

45. The flywheel energy storage system of claim 44, wherein the relative motion being allowed is in one of in one direction, in two directions or in three directions.

46. The flywheel energy storage system of claim 44, wherein the relative motion being allowed is in at least one of a radial direction, an axial direction, or an angular direction.

47. The flywheel energy storage system of claim 46, wherein the flexible thermally conductive member is configured and arranged so as to have spring constants in each of the axial, radial and angular directions that are equal to or less than a desired value for each of the axial, radial and angular directions.

48. A flywheel energy storage system comprising:

a flywheel;

a shaft to which is secured the flywheel;

at least one bearing assembly that rotatably supports the shaft;

a heat sink;

a heat conduction device for said at least one bearing assembly, the heat conduction device including a flexible thermally conductive member, a first end of which is thermally coupled to the at least one bearing assembly, and a second end of which is thermally coupled to a heat sink; and a plurality of flexible thermally conductive members, where the first end of each of the plurality of flexible thermally conductive members is thermally coupled to the at least one bearing assembly and where the second end of each of the plurality of flexible thermally conductive members is thermally coupled to the heat sink.

49. The flywheel energy storage system of claim 40, further comprising:

a first thermally conductive member being configured and arranged to thermally couple the first end of the flexible thermally conductive member to the at least one bearing assembly; and a second thermally conductive member being configured and arranged to thermally couple the second end of the flexible thermally conductive member to the heat sink.

50. The flywheel energy storage system of claim 49, wherein the first thermally conductive member and the second thermally conductive member are arranged such that the flexible thermally conductive member extends therebetween in on of a generally radial direction or a generally axially direction.

51. The flywheel energy storage system of claim 50, wherein at least a portion of the flexible thermally conductive member extending therebetween is arcuate.

52. The flywheel energy storage system of claim 40, wherein the flexible thermally conductive member comprises a thermally conductive material that is at least one of copper, aluminum, silver and carbon.

53. The flywheel energy storage system of claim 49, wherein each of the first and second thermally conductive members comprises a thermally conductive material that is at least one of copper, aluminum, silver and carbon.

54. The flywheel energy storage system of claim 40, further comprising a plurality of heat conduction devices for said at least one bearing assembly.

55. The flywheel energy storage system of claim 40, wherein the flexible, thermally conductive member is arcuate.

56. The flywheel energy storage system of claim 48, wherein each of the plurality of flexible, thermally conductive members is arcuate.

57. A flywheel energy storage system comprising:

a flywheel;

a shaft to which is secured the flywheel;

at least one bearing assembly that rotatably supports the shaft;

a heat sink;

a heat conduction device for said at least one bearing assembly, the heat conduction device including a flexible thermally conductive member, a first end of which is thermally coupled to the at least one bearing assembly, and a second end of which is thermally coupled to a heat sink; and wherein the flexible thermally conductive member is a flexible multi-strand cable, where one or more strands comprises a thermally conductive material.

58. A flywheel energy storage system comprising:
a flywheel;
a shaft to which is secured the flywheel;
a heat sink;
a plurality of bearing assemblies that rotatably supports the shaft;
a heat conduction device for said at least one bearing assembly, the heat conduction device including a plurality of heat conduction devices at least one for each of the plurality of bearing assemblies; and
wherein each of the plurality of the heat conduction devices includes a flexible thermally conductive member, where a first end of the flexible thermally conductive member of said at least one of the plurality of heat conduction devices is thermally coupled to a corresponding one of the plurality of bearing assemblies, and where a second end of the flexible thermally conductive member of said at least one of the plurality of heat conduction devices is thermally coupled to the heat sink.

59. A flywheel energy storage system comprising:
a flywheel;
a shaft to which is secured the flywheel;
at least one bearing assembly that rotatably supports the shaft;
a heat sink;
a plurality of heat conduction devices for said at least one bearing assembly, the heat conduction device including:
a first thermally conductive member that is thermally coupled to said at least one bearing assembly;
a second thermally conductive member that is thermally coupled to the heat sink;
a third thermally conductive member that is thermally coupled to the first and second thermally conductive members such that at least some of the heat energy being generated by said at least one bearing assembly is thermally conducted to the heat sink via the first, third and second conductive members respectively; and
wherein the third thermally conductive member is configured and arranged so as to allow relative motion between the first and second thermally conductive members.

60. A flywheel energy storage system comprising:
a flywheel;
a shaft to which is secured the flywheel;
a plurality of bearing assembly that rotatably supports the shaft;
a heat sink;
a plurality of heat conduction devices, at least one heat conduction device for each of said plurality of bearing assemblies, each of the plurality of heat conduction devices including:
a first thermally conductive member that is thermally coupled to said at least one bearing assembly;
a second thermally conductive member that is thermally coupled to the heat sink;
a third thermally conductive member that is thermally coupled to the first and second thermally conductive members such that at least some of the heat energy being generated by said at least one bearing assembly is thermally conducted to the heat sink via the first, third and second conductive members respectively; and
wherein the third thermally conductive member is configured and arranged so as to allow relative motion between the first and second thermally conductive members.

61. The flywheel energy storage system of claim 60, wherein there is a plurality of heat conduction devices for each of said plurality of bearing assemblies.

62. The flywheel energy storage system of claim 59, wherein the relative motion being allowed is in one of in one direction, in two directions or in three directions.

63. The flywheel energy storage system of claim 59, wherein the relative motion being allowed is in at least one of a radial direction, an axial direction, or an angular direction.

64. A flywheel energy storage system comprising:
a flywheel;
a shaft to which is secured the flywheel;
at least one bearing assembly that rotatably supports the shaft;
a heat sink;
a heat conduction device for said at least one bearing assembly, the heat conduction device including:
a first thermally conductive member that is thermally, conductively interconnected to said at least one bearing assembly;
a second thermally conductive member that is thermally, conductively interconnected to the heat sink;
a multiplicity of arcuate, flexible, thermally, conductive elements, each conductive element extending between, and being thermally interconnected to, the first and second thermally conductive members such that at least some of the heat energy being generated by the bearing assembly is thermally conducted to the heat sink via the first conductive member, the multiplicity of conductive elements and the second conductive member respectively;
wherein each conductive element is a flexible multi-strand cable, each strand be made from a thermally conductive material; and
wherein the multiplicity of conductive elements are configured and arranged so as to yield a structure that allows relative motion between the first and second thermally conductive members.

65. The flywheel energy storage system of claim 64, wherein the structure yielded allows relative motion in one of in one direction, in two directions or in three directions.

66. The flywheel energy storage system of claim 64, wherein the structure yielded allows relative motion in at least one of a radial direction, an axial direction, or an angular direction.

* * * * *